United States Patent
Cho et al.

(10) Patent No.: US 9,866,669 B2
(45) Date of Patent: Jan. 9, 2018

(54) MOBILE DEVICE AND METHOD OF CONTROLLING THE SAME

(71) Applicant: LG ELECTRONICS INC., Seoul (KR)

(72) Inventors: Sungbae Cho, Seoul (KR); Yongtaek Gong, Seoul (KR); Joonho Um, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/122,899

(22) PCT Filed: Mar. 3, 2014

(86) PCT No.: PCT/KR2014/001730
§ 371 (c)(1),
(2) Date: Aug. 31, 2016

(87) PCT Pub. No.: WO2015/133658
PCT Pub. Date: Sep. 11, 2015

(65) Prior Publication Data
US 2017/0078468 A1    Mar. 16, 2017

(51) Int. Cl.
*H04M 1/725* (2006.01)
*G06F 1/16* (2006.01)
*H04M 1/02* (2006.01)

(52) U.S. Cl.
CPC ...... *H04M 1/72519* (2013.01); *G06F 1/1626* (2013.01); *G06F 1/1652* (2013.01);
(Continued)

(58) Field of Classification Search
CPC ......... H04M 1/72519; H04M 1/72522; H04M 1/71552; H04M 1/0214; H04M 1/0268;
(Continued)

(56) References Cited

U.S. PATENT DOCUMENTS 7,508,657 B1 * 3/2009 Smith .................. G06F 1/1601
361/679.24
7,965,835 B2 * 6/2011 Park ...................... G06F 1/1616
379/433.13
(Continued)

FOREIGN PATENT DOCUMENTS

EP    2613234    5/2009
EP    2648064    4/2013
(Continued)

OTHER PUBLICATIONS

PCT International Application No. PCT/KR2014/001730, Written Opinion of the International Searching Authority dated Nov. 26, 2014, 12 pages.
(Continued)

*Primary Examiner* — Hai V Nguyen
(74) *Attorney, Agent, or Firm* — Lee, Hong, Degerman, Kang & Waimey

(57) ABSTRACT

The present disclosure discloses a mobile device and a method of controlling the same. In this case, the mobile device according to the present invention includes a sensor unit configured to detect a first action and a second action of a user to fold the mobile device, a control unit configured to control a folding indicator to be outputted on a screen according to the detected first action of the user, configured to control a function corresponding to the detected second action to be executed, configured to control data resulted from executing the function to be outputted on the screen, configured to control the mobile device based on the outputted data, and a display configured to output the folding indicator and the data resulted from executing the function.

20 Claims, 21 Drawing Sheets

(52) U.S. Cl.
CPC ....... *H04M 1/0214* (2013.01); *H04M 1/0268* (2013.01); *H04M 1/72522* (2013.01); *H04M 1/72552* (2013.01); *H04M 2250/16* (2013.01); *H04M 2250/22* (2013.01)

(58) Field of Classification Search
CPC .......... H04M 2250/16; H04M 2250/22; G06F 1/1626; G06F 1/1652
USPC ........................................................ 455/566
See application file for complete search history.

(56) References Cited

U.S. PATENT DOCUMENTS

| | | | | |
|---|---|---|---|---|
| 8,271,047 | B2* | 9/2012 | Kim | G06F 1/1615 345/156 |
| 8,866,840 | B2* | 10/2014 | Dahl | G06F 1/1616 345/1.3 |
| 8,933,874 | B2* | 1/2015 | Lundqvist | G06F 1/1616 345/1.3 |
| 9,176,956 | B2* | 11/2015 | Kim | G06F 17/30023 |
| 9,607,169 | B2* | 3/2017 | You | G06F 21/6218 |
| 2004/0104898 | A1* | 6/2004 | Badarneh | G06F 1/1626 345/169 |
| 2007/0103382 | A1* | 5/2007 | Chang | H04B 1/38 345/1.1 |
| 2007/0118671 | A1* | 5/2007 | Ganti | G06F 1/1616 710/1 |
| 2010/0011291 | A1* | 1/2010 | Nurmi | G06F 3/0414 715/702 |
| 2010/0053074 | A1 | 3/2010 | Cohen et al. | |
| 2010/0085382 | A1* | 4/2010 | Lundqvist | G06F 1/1616 345/659 |
| 2010/0085697 | A1* | 4/2010 | Park | G06F 1/1616 361/679.27 |
| 2010/0182265 | A1* | 7/2010 | Kim | G06F 1/1616 345/173 |
| 2011/0216064 | A1* | 9/2011 | Dahl | G06F 1/1616 345/428 |
| 2013/0062828 | A1* | 3/2013 | Cube-Sherman | A63F 9/0876 273/153 S |
| 2013/0135182 | A1* | 5/2013 | Jung | G09G 3/00 345/30 |
| 2015/0254471 | A1* | 9/2015 | You | G06F 21/6218 726/19 |

FOREIGN PATENT DOCUMENTS

| | | |
|---|---|---|
| EP | 2685373 | 7/2013 |
| EP | 2693319 | 7/2013 |
| KR | 10-2010-0103095 | 9/2010 |
| KR | 10-2013-0113901 | 10/2013 |

OTHER PUBLICATIONS

European Patent Office Application Serial No. 14884367.5, Search Report dated Jul. 28, 2017, 10 pages.

* cited by examiner

FIG. 6
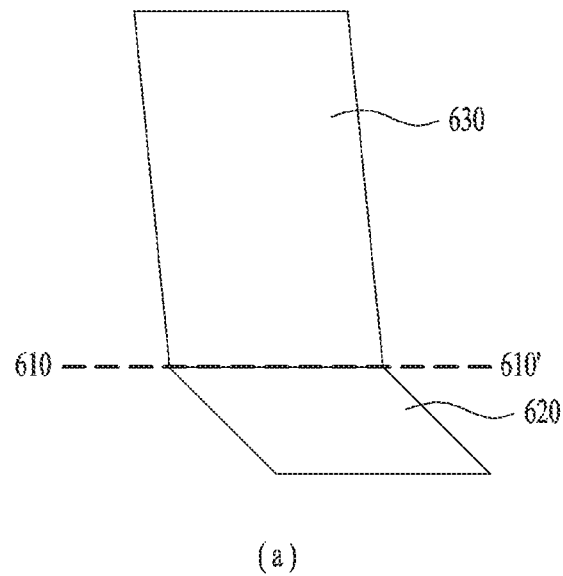
(a)
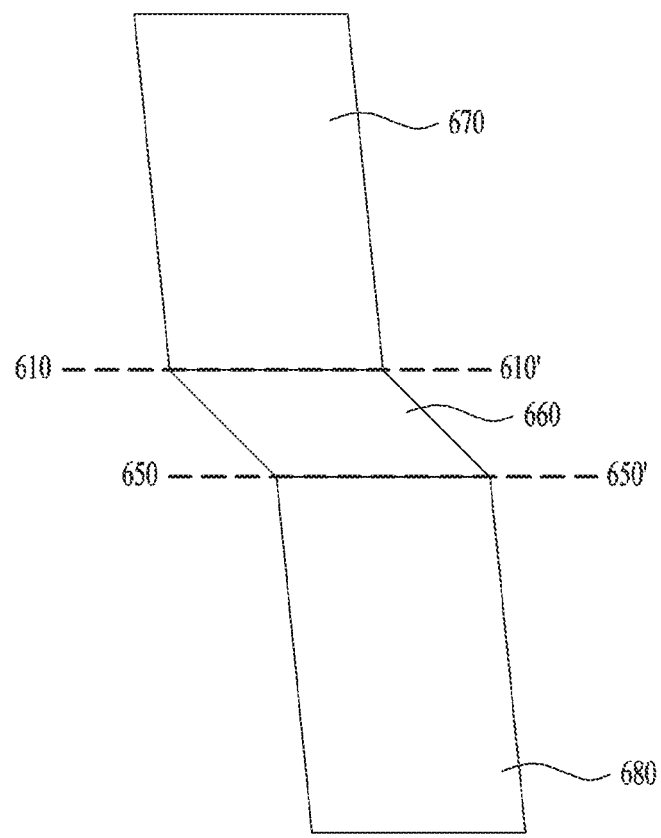
(b)

FIG. 7
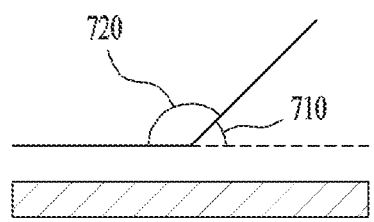
(a)
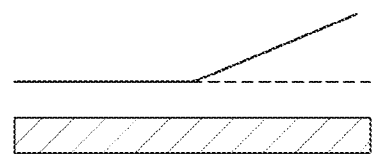
(b)
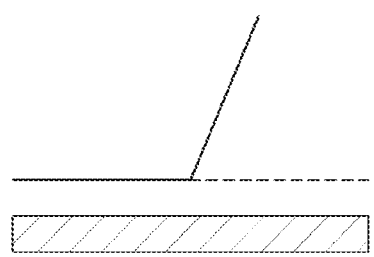
(c)
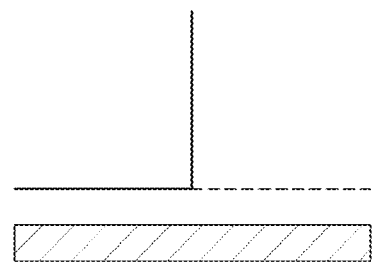
(d)
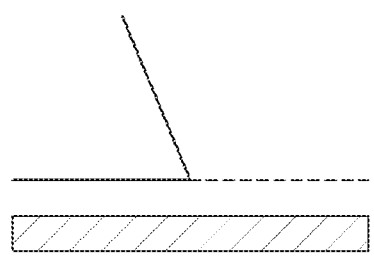
(e)
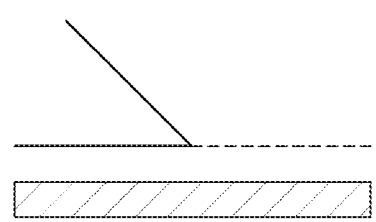
(f)

(a)  (b)

FIG. 12
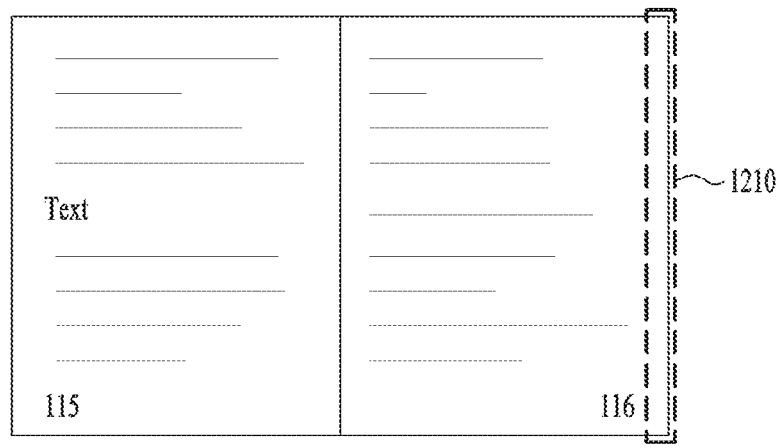
(a)
Folding
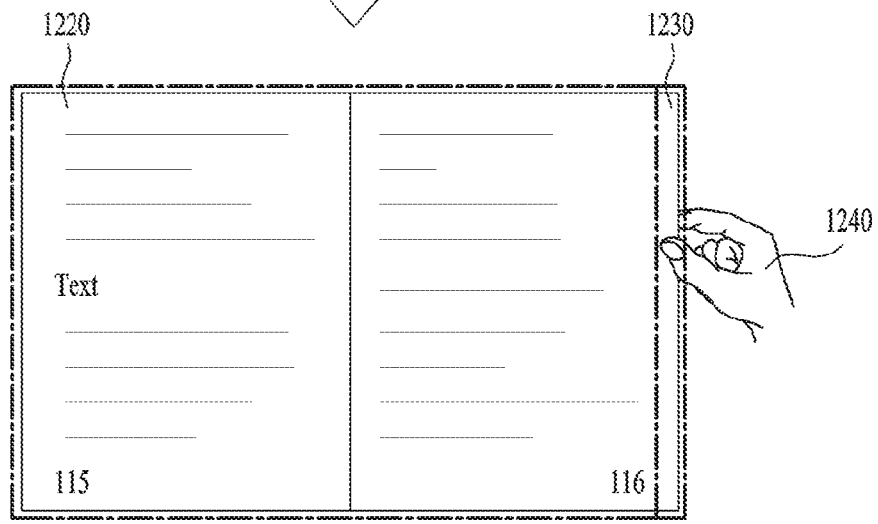
(b)

FIG. 16
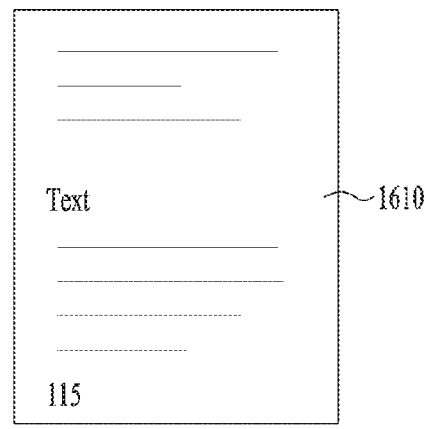
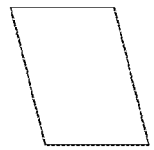
(a)
↕ Folding
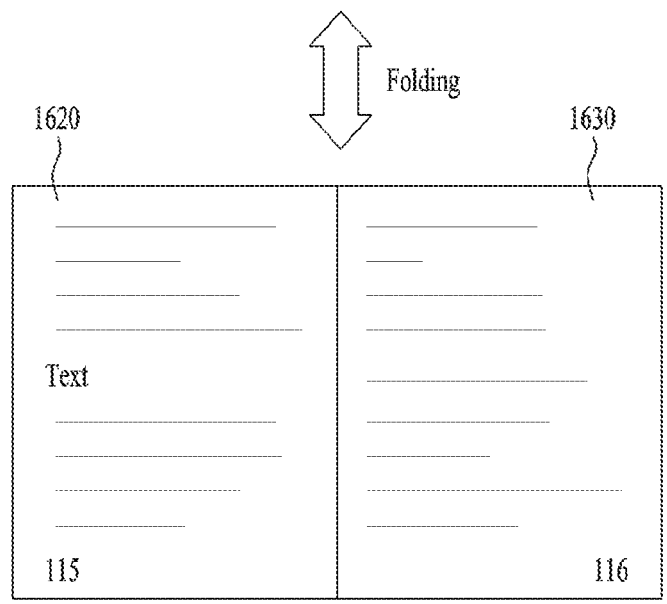
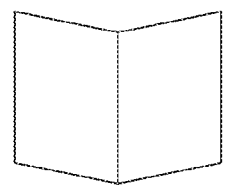
(b)

(a) (b)

(a)　　　　　　　　　　　(b)

MOBILE DEVICE AND METHOD OF CONTROLLING THE SAME

CROSS-REFERENCE TO RELATED APPLICATIONS

This application is the National Stage filing under 35 U.S.C. 371 of International Application No. PCT/KR2014/001730, filed on Mar. 3, 2014, the contents of which are all hereby incorporated by reference herein in their entirety.

TECHNICAL FIELD

The present invention relates to a mobile device and a method of controlling the same, and more particularly, to a method of controlling the mobile device according to folding of the mobile device.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

A legacy display is mainly used for a monitor of a TV or a PC only. Yet, as a mobile market is rapidly developing, a study on the display used for a smartphone or a tablet PC is vitalizing.

Until a recent date, interest in a display technology has been focused on a resolution. For instance, product satisfaction and sales volume of a smartphone or a tablet PC are considerably affected by a resolution of a display adopted to the smartphone or the tablet PC. The interest in the resolution can be easily seen by interest in such a display as a digital TV supporting a recently highlighted UHD, i.e., ultra high definition resolution, and the like.

Meanwhile, in a point of view different from the resolution, a display can be described as follows. A legacy display is mostly made of a flat and hard material in a square-shape. Yet, according to a recent display technology, a display device is evolving to a device having flexibility and capable of being folded instead of the legacy display. The development of the display technology is contributing to commercialization of a wearable device together with formation and development of the mobile market.

Yet, according to a currently introduced display technology, since a folding is implemented in an angle within a prescribed range only or the folding is performed for a specific area only, the currently introduced technology is used only for a purpose of making a user more concentrate on a screen or the like.

Hence, if a foldable display is adopted according to the development of a wearable device or a mobile device for which a recent study is vitalizing and relevant market is forming, it may cause a problem since a concrete method of using the foldable display or the like is not defined yet.

DISCLOSURE OF INVENTION

Technical Problem

The present invention is proposed to satisfy the aforementioned necessity. One object of the present invention is to provide a mobile device configured to perform an operation according to folding of the mobile device and a method of controlling the same.

According to at least one of embodiments of the present invention, another object of the present invention is to output data consistent with an intention of a user according to a folding action of the user.

According to at least one of embodiments of the present invention, another object of the present invention is to perform various control operations according to a single folding action and multi-folding actions of a user.

According to at least one of embodiments of the present invention, another object of the present invention is to perform various control operations according to a folding angle, a folding number, and the like for a folding action of a user.

According to at least one of embodiments of the present invention, the other object of the present invention is to provide a function consistent with a folding action of a user in accordance with content currently using on a screen and data according to the function.

Solution to Problem

To achieve these and other advantages and in accordance with the purpose of the present invention, as embodied and broadly described, a method of controlling a mobile device includes the steps of detecting a first action of a user, outputting a folding indicator on a screen according to the detected first action of the user, detecting a second action of the user, executing a function corresponding to the detected second action and outputting data resulted from executing the function on the screen, and controlling the device based on the outputted data.

In the foregoing description, the folding indicator may include at least one of one or more foldable lines and data on a function corresponding to the at least one foldable line on the screen.

And, the data resulted from executing the function can be outputted in one or more areas which are divided according to the second action of the user on the screen.

And, each area divided on the screen can be individually controlled according to a third action of the user.

And, the second action includes at least one action of an action for a single folding and an action for multi-folding. The multi-folding can include at least one of folding for an identical foldable line and folding for foldable lines different from each other.

And, the function corresponding to the detected second action may vary according to whether the detected second action corresponds to the action for the single folding or the action for the multi-folding.

And, the executed function can be determined according to at least one selected from the group consisting of a folding line, a folding angle, and the number of folding.

And, the method may further include one or more steps of identifying a folding line on the screen according to the detected second action of the user, comparing the identified folding line with a folding line to execute a specific function on the screen, and if the folding lines are positioned within a predetermined range according to the comparison, generating the data to execute the function.

And, the step of executing the function corresponding to the detected second action and outputting the data resulted from executing the function on the screen is to generate an auxiliary data for the data resulted from executing the function and output the auxiliary data on the screen together with the data resulted from executing the function.

And, the method may further include the steps of identifying at least one object capable of being selected or separated from content outputted on the screen and outputting the identified at least one object in one area among the areas divided by the second action of the user on the screen in a manner of separating the identified at least one object from the content.

To further achieve these and other advantages and in accordance with the purpose of the present invention, a mobile device includes a sensor unit configured to detect a first action and a second action of a user to fold the mobile device, a control unit configured to control a folding indicator to be outputted on a screen according to the detected first action of the user, configured to control a function corresponding to the detected second action to be executed, configured to control data resulted from executing the function to be outputted on the screen, and configured to control the mobile device based on the outputted data, and a display configured to output the folding indicator and the data resulted from executing the function.

In the foregoing description, the folding indicator may include at least one of one or more foldable lines and data on a function corresponding to the at least one foldable line on the screen.

And, the control unit can control the data resulted from executing the function to be outputted in one or more areas which are divided according to the second action of the user on the screen.

And, the control unit can individually control each area divided on the screen according to a third action of the user.

And, the second action includes at least one action of an action for a single folding and an action for multi-folding and the multi-folding may include at least one of folding for an identical foldable line and folding for foldable lines different from each other.

And, the control unit can control the function corresponding to the detected second action to be differently executed according to whether the detected second action corresponds to the action for the single folding or the action for the multi-folding.

And, the control unit can determine the executed function according to at least one selected from the group consisting of a folding line, a folding angle, and the number of folding.

And, the control unit identifies a folding line on the screen according to the detected second action of the user, compares the identified folding line with a folding line to execute a specific function on the screen, and if the folding lines are positioned within a predetermined range according to the comparison, can generate the data to execute the function.

And, the control unit executes the function corresponding to the detected second action, outputs the data resulted from executing the function on the screen, generates an auxiliary data for the data resulted from executing the function, and can control the auxiliary data to be outputted on the screen together with the data resulted from executing the function.

And, the control unit identifies at least one object capable of being selected or separated from content outputted on the screen and can control the identified at least one object to be outputted in one area among the areas divided by the second action of the user on the screen in a manner of separating the identified at least one object from the content.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects of Invention

Accordingly, a mobile device and a method of controlling the same according to the present invention provide the following effects or advantages.

First of all, according to at least one of embodiments of the present invention, it is able to output data consistent with an intention of a user according to a folding action of the user.

According to at least one of embodiments of the present invention, it is able to perform various control operations according to a single folding action and multi-folding actions of a user.

According to at least one of embodiments of the present invention, it is able to perform various control operations according to a folding angle, a folding number, and the like for a folding action of a user.

According to at least one of embodiments of the present invention, it is able to provide a function consistent with a folding action of a user in accordance with content currently using on a screen and data according to the function.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The present invention will become more fully understood from the detailed description given herein below and the accompanying drawings, which are given by illustration only, and thus are not limitative of the present invention, and wherein:

FIG. 3 to FIG. 6 is a diagram for explaining a folding area for a flexible display of a mobile device according to the present invention;

FIG. 7 is a diagram for a display of a device seen from a side according to the present invention;

FIG. 12 to FIG. 16 is a diagram for explaining a method of controlling an e-book application in accordance with folding of a device when the e-book application is executed in the device according to the present invention;

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the disclosure, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
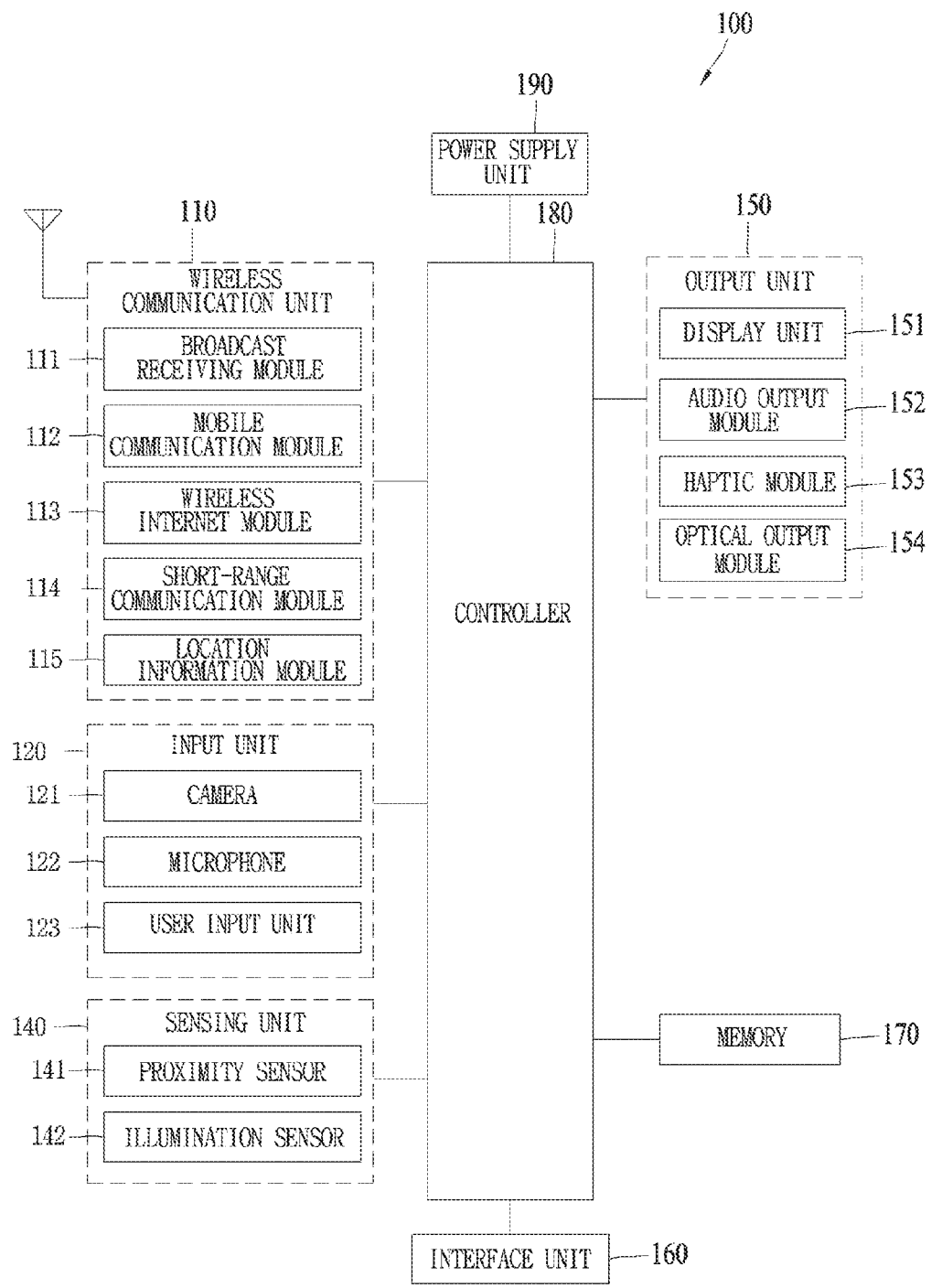
FIG. 1a is a block diagram of a mobile terminal in accordance with the present disclosure.
Figure 1B:
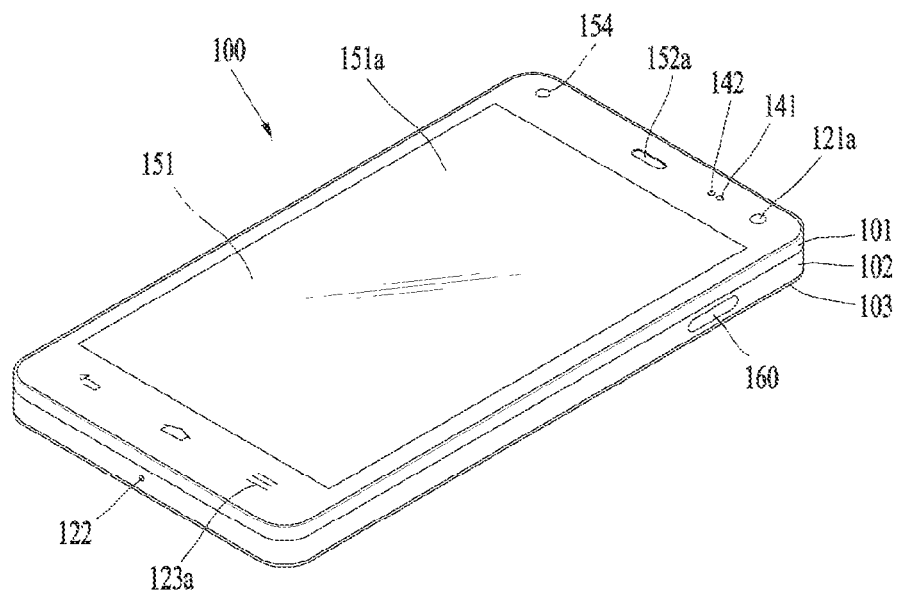
FIGS. 1b and 1c are conceptual views of one example of the mobile terminal, viewed from different directions.
Figure 1C:
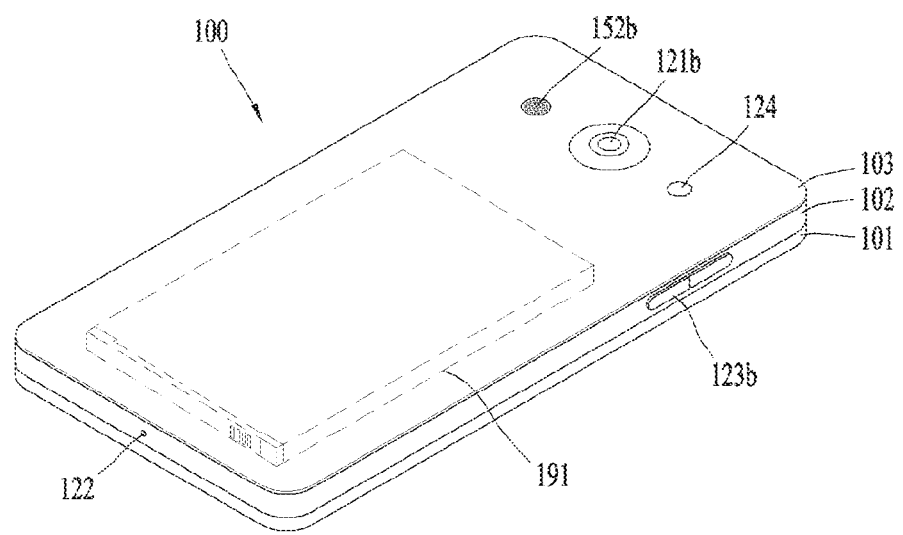

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1*a*, or activating application programs stored in the memory 170. As one example, the controller 180 controls some or all of the components illustrated in FIGS. 1*a*-1*c* according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1*a*, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
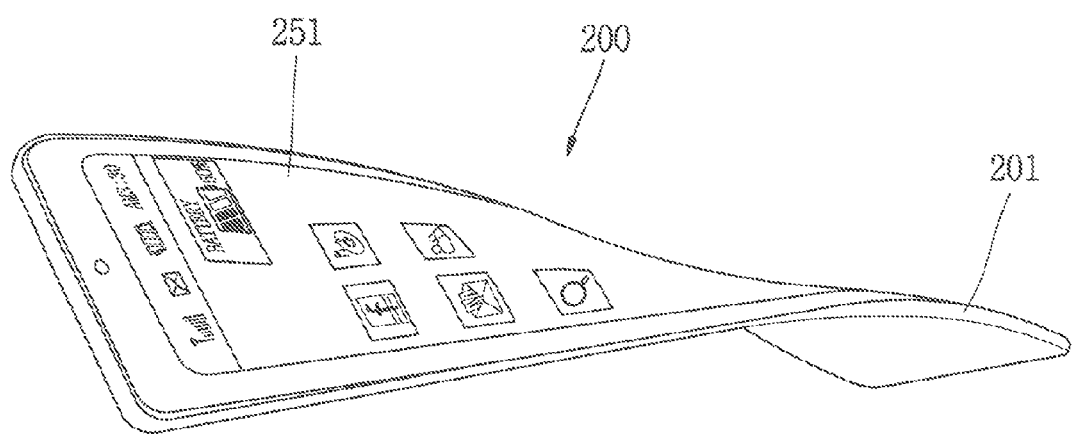
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1a-1c.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

First of all, in describing a mobile device and a method of controlling the same according to the present invention, the present disclosure describes activation of a function according to folding a part of a display and then describes relevant specific embodiment(s) in the following.

As mentioned in the foregoing description, the activation of the function according to the folding of the mobile device to which a flexible display is adopted is explained as follows.

A user of the mobile device to which the flexible display is adopted can variously fold a part of the display in the course of using the mobile device. Yet, although the part of the display is folded, a prescribed function is not always activated. This is because the mobile device is generally configured to execute a function mapped in advance when a prescribed area of the display is folded within a prescribed range according to a predetermined configuration only. Hence, although the user folds a part of the display, if the folded area does not correspond to a predetermined area or if a folding angle does not correspond to a predetermined angle, a certain function is activated or inactivated. Or, an unwanted function may be executed due to the action of the user.

Hence, it is necessary for the mobile device to identify an area in which a function is activated and a function to be activated as the part of the display is folded.

FIG. 3 to FIG. 6 is a diagram for explaining a folding area for a flexible display of a mobile device according to the present invention.

Figure 3:
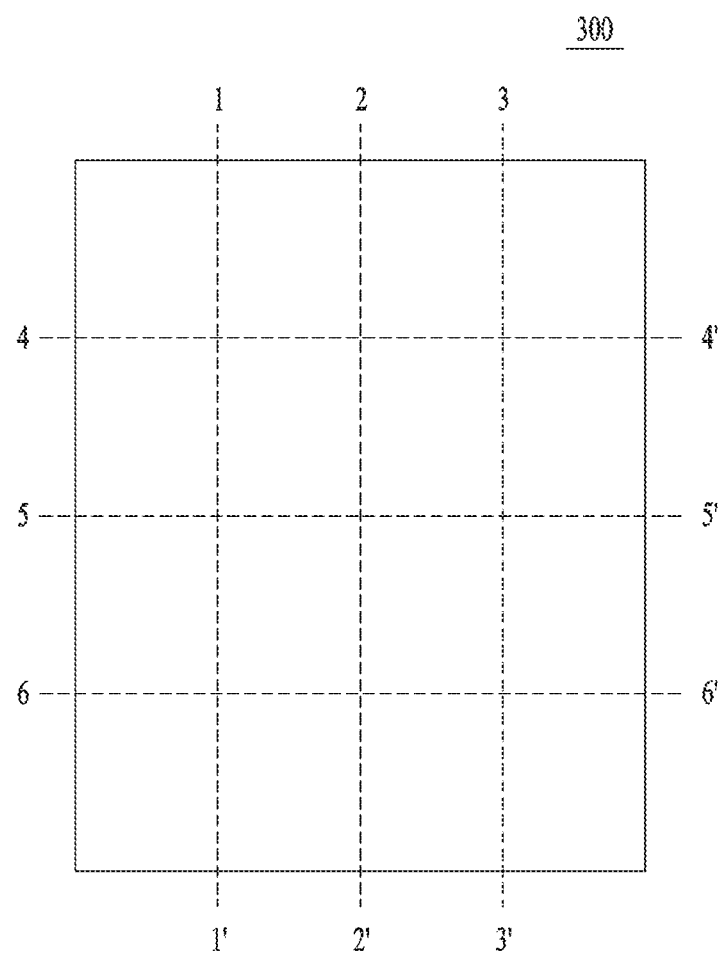

For instance, 1-1' to 6-6' depicted in FIG. 3 may indicate an area capable of being folded on a display 300.

In particular, among the 1-1' to 6-6', 1-1' to 3-3' indicates an area capable of being vertically folded and 4-4' to 6-6' indicates an area capable of being horizontally folded.

Figure 4:
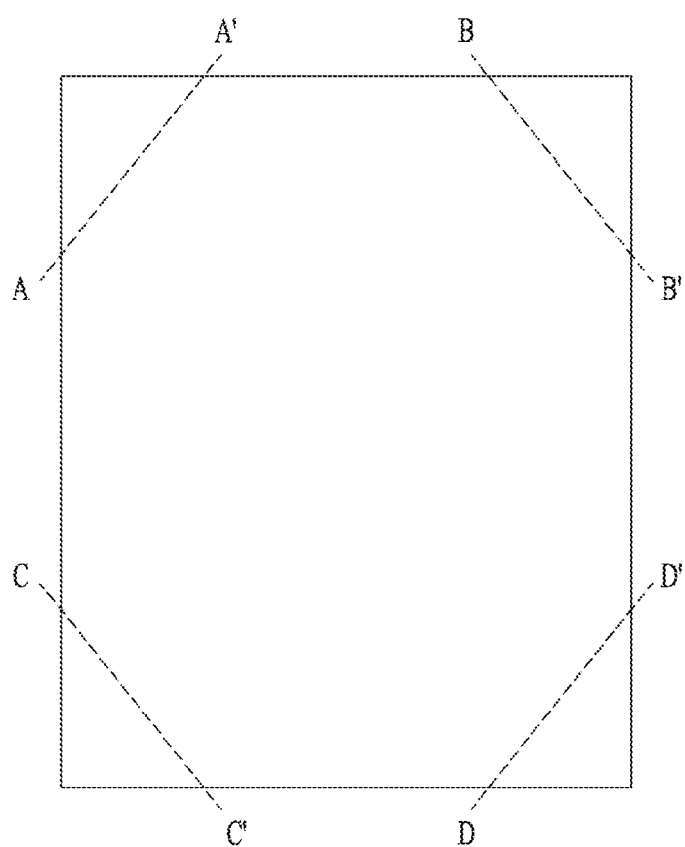

While FIG. 3 explains a horizontal or vertical folding of a display on the basis of a display plane such as an orthogonal coordinate system, FIG. 4 shows an implementation capable of folding corner areas of the display 300.

Referring to FIG. 4, A-A' indicates an area capable of being folded in the top left part of the display 300, B-B' indicates an area capable of being folded in the top right part of the display, C-C' indicates an area capable of being folded in the bottom left part of the display, and D-D' indicates an area capable of being folded in the bottom right part of the display.

FIG. 4 is different from FIG. 3 in that the display 300 of a square-shape is not folded in a right angle form as depicted in FIG. 3.

Figure 5:
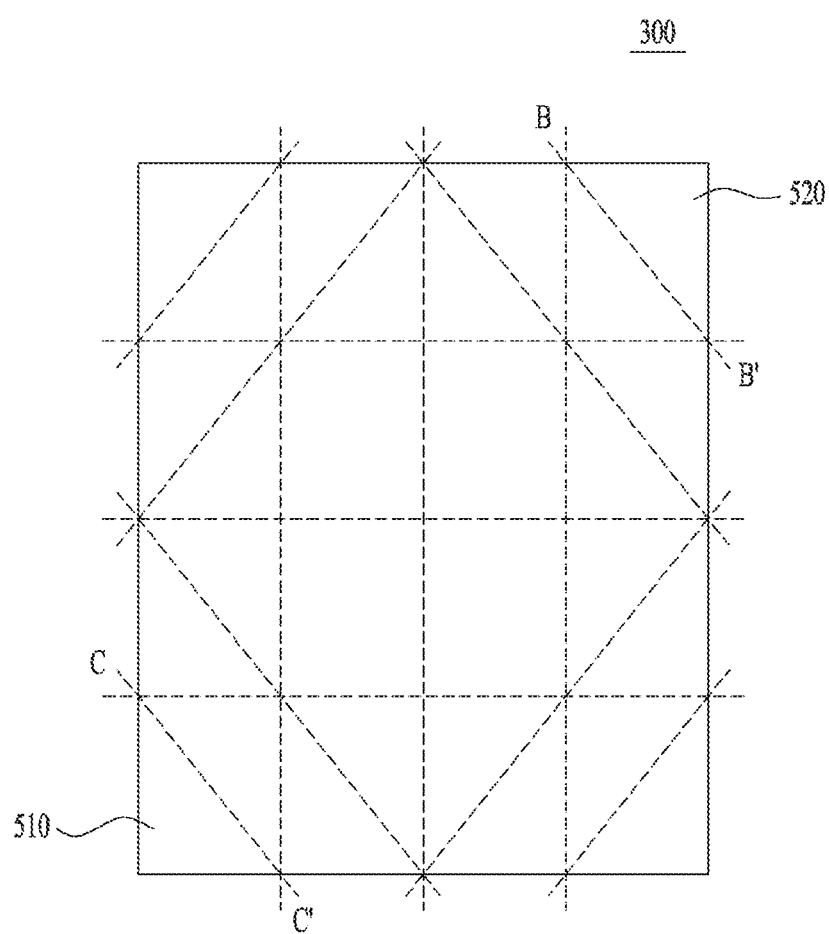

Meanwhile, FIG. 5 shows one embodiment that the aforementioned FIG. 3 and FIG. 4 are combined with each other.

In this case, the display 300 of the device can display an area capable of being folded as depicted in FIG. 3 to FIG. 5 for the convenience of folding of a user automatically or according to a request of the user.

And, in relation to the present invention, the areas capable of being folded maybe identically provided in general as depicted in FIG. 3 to FIG. 5 or maybe not. In the latter case, for instance, the areas capable of being folded may be not identically provided and activated. Instead, the areas capable of being folded are provided and activated in a specific area only to provide convenience to a user. This is because if the display is capable of being identically folded irrespective of a state of the display, it may cause inconvenience to the user due to an operation different from an intention of the user or occurrence of an error resulted from executing an unintended function.

Moreover, although it is not depicted in the present disclosure, a folding may include a single folding and multi-folding. Meanwhile, a mapping function to execute the single folding and the mapping function to execute the multi-folding may be different from each other.

In this case, for instance, the single folding indicates a case that a prescribed single area is folded only among a plurality of areas capable of being folded depicted in FIG. 3 to FIG. 5 and the multi-folding indicates a case that at least two areas are folded at the same time.

Meanwhile, in case of performing the multi-folding, although folding is performed for areas identical to each other, functions different from each other can be activated according to an order of the folding.

For instance, referring to FIG. 5, if A-A' area corresponding to an area capable of being folded on a first area 510 of the bottom left part is firstly folded and then B-B' area corresponding to an area capable of being folded on a second area 520 is folded, on the contrary, if B-B' area is firstly folded and then A-A' area is folded, an identical function may be executed in both cases. Or, a totally different function may be executed in each case.

Meanwhile, if folding is sequentially performed for two or more areas among the areas capable of being folded and time interval between a first folding and a second folding is within a predetermined time range, the device recognizes it as multi-folding and may be then able to execute a function configured according to the multi-folding.

On the contrary, despite the folding is performed for a plurality of areas, if the time interval between pluralities of the folding exceeds the predetermined time range, the device recognizes it as an individual single folding and may be then able to execute a function configured according to the single folding.

In this case, if each of the single folding is performed for a plurality of the areas, despite the folding is performed for an area identical to the area where a single folding is performed for a single area, a different function may be activated. On the contrary, if a single folding is performed for a plurality of the areas, respectively, a function configured to be performed for a corresponding area can be identically activated to meet user experience or memory for the single folding of the corresponding area.

Besides, if a single or multi-folding is performed for a certain part of the display, the device may differently operate according to whether each of the folding is sustained. For instance, a user of the device can continuously maintain folding after a prescribed area of the device is folded. On the other hand, the user of the device can cancel or release the folding within a predetermined time after the prescribed area of the device is folded. In the former case, for instance, in case that an E-book application is executed in the device, a user may put the device on a certain place instead of continuously carrying the device. In this case, the user may attempt to have convenience of using the device by folding an area of the device necessary for putting the device on. On the contrary, in the latter case, for instance, if brightness or an amount of volume adjustment of a certain area varies according to each folding, the user temporarily folds the area and releases the area again instead of continuously maintaining a folded state. As mentioned in the foregoing description, the device can differently control the display according to whether a folded state is sustained in the display or time of maintaining the folded state.

Meanwhile, the device may differently operate according to the number of folding. For instance, in case that folding and folding release are repeated for an area, the device may perform a different function according to the number of the folding the area. This can be mainly performed for an identical area but various operations can be defined and controlled in a manner of being combined with the folding number for a different area.

Moreover, in case that a single or multi-folding is performed for a certain area in the display, the device may differently operate according to a folding angle of each folding. For instance, as depicted in FIG. 6, assume that there exist two areas 620/630 in a manner that the display of the device is folded between 610-610'. In this case, for instance, the display can be differently controlled according to the folding angle formed by a second area 630 on the basis of a first area 620.

FIG. 7 is a diagram for a display of a device seen from a side according to the present invention.

FIG. 7 (a) is a diagram for explaining a folding angle to be described in the following. In this case, the folding angle may correspond to either an angle of 45 degrees 710 or an angle of 135 degrees 720. Yet, for clarity, if it is assumed that a first area becomes a reference and the first area is horizontally maintained with a flat surface, an angle 710 formed by the flat surface and a rear side of a second area is defined as the folding angle.

According to the aforementioned definition, FIG. 7 (a) shows the folding angle of 45 degrees, FIG. 7 (b) shows the folding angle of 30 degrees, FIG. 7 (c) shows the folding angle of 60 degrees, FIG. (d) shows the folding angle of 90 degrees, FIG. 7 (e) shows the folding angle of 120 degrees, and FIG. 7 (f) shows the folding angle of 135 degrees.

Hence, the device can be differently controlled according to a folding angle even in case of a single folding.

The aforementioned contents can also be identically applied to a multi-folding of the device as depicted in FIG. 6 (b).

For instance, referring to FIG. 6 (b), a first folding (610-610') and a second folding (650-650'), i.e., multi-folding are performed in the display. Due to the multi-folding, there exist three areas 660/670/680 capable of outputting contents different from each other. In this case, as depicted in FIG. 7, a folding angle of each area can be known on the basis of an angle formed by areas contacted with each other. Or, as depicted in FIG. 6 (b), in case that there exist three areas, the folding angle of a different area can be known on the basis of a most core area or an area contacted with different areas most, e.g., an area 660 positioned at the middle of the display.

A folding is performed in the device to which a flexible display is adopted according to the aforementioned FIG. 3 to FIG. 7.

In the following description, activation of a function according to a folding of the present invention is explained in more detail.

Figure 8:
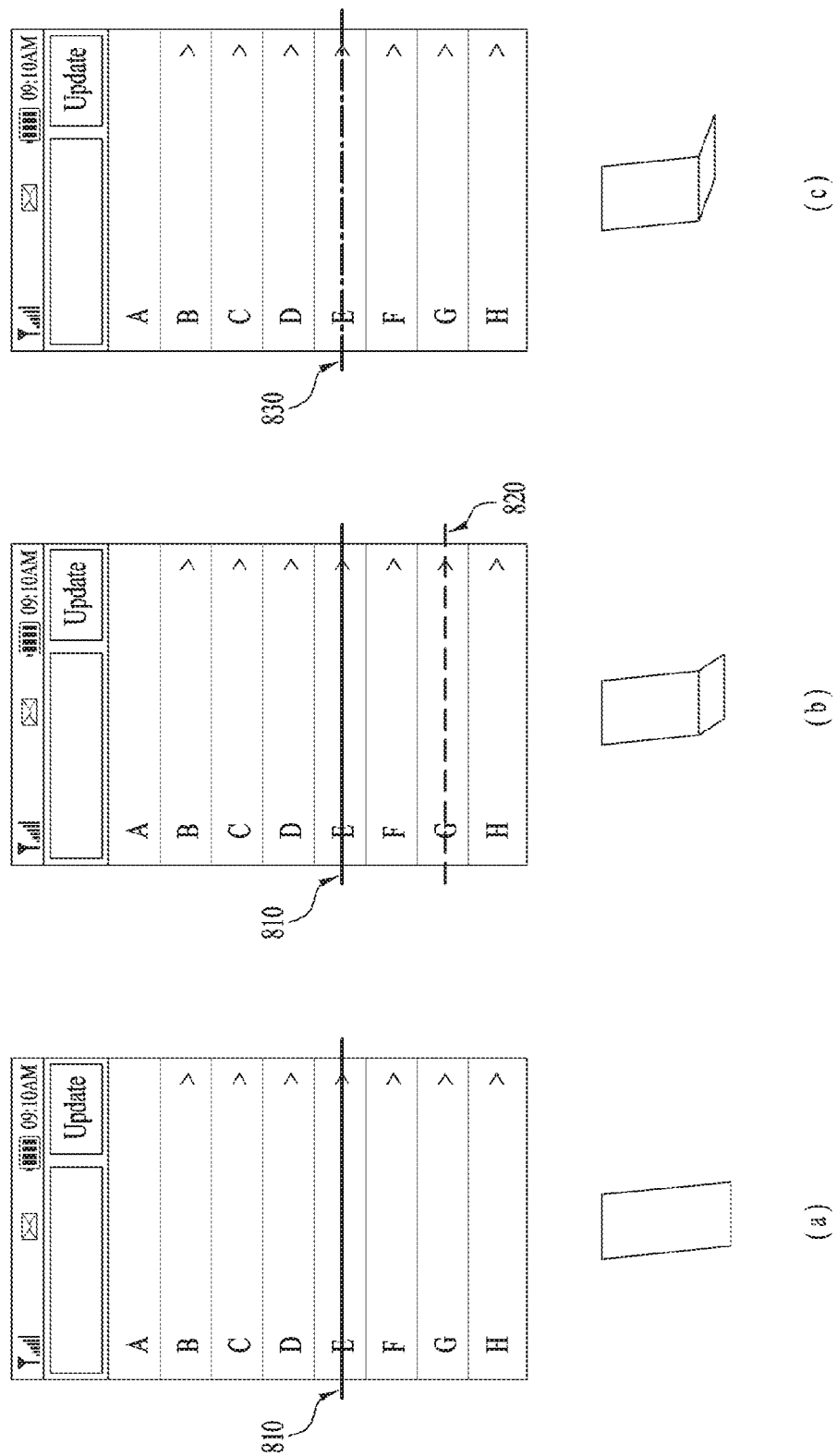
FIG. 8 is a diagram for explaining an operation of a device in accordance with a difference between an area folded by a user and a folding area where a function is activated according to the present invention.

FIG. 8 is a diagram for explaining an operation of a device in accordance with a difference between an area folded by a user and a folding area where a function is activated according to the present invention.

FIG. 8a shows a display of the device before a folding is performed, FIG. 8b shows the display where a folding is performed by a user, and FIG. 8c shows the display outputting an indicator 830 for the convenience of the folding performed by the user.

Referring to FIG. 8a, the display executes a function or an application. In this case, for instance, there exists an area 810 where a single folding can be performed in the display of a corresponding screen.

Yet, as depicted in FIG. 8b, if a user folds a different area 820 irrespective of whether the user knows the folding area 810, there may exist a problem for the device to process the above situation.

The device may process the above situation in various ways.

If there exists one area capable of being folded only in the corresponding screen, an intention of the user may correspond to folding the area. Hence, as depicted in FIG. 8b, although the user has folded the different area 820, the device considers it as folding for a folding area and may process it in a manner of being identical to a case that the folding area 810 is folded.

Or, the device compares the folding area 810 with the area 820 folded by the user. If a distance between the folding area and the area folded by the user is within a predetermined range, since it is difficult for the user to fold the area in a manner of exactly matching with the folding area, this can be determined as the intention of the user to fold the folding area 810. If the distance exceeds the predetermined range, an operation performed in case that the folding area 810 is folded may not be performed despite the area is folded by the user. For instance, the above-mentioned content can also be utilized for a case that there exists a plurality of areas capable of being folded on a screen. In particular, the device determines which folding area is close to the area folded by the user among the areas capable of being folded to identify a folding intention of the user and can make an operation corresponding to the folding intention to be performed. If distances between the area folded by the user and two folding areas are exactly matched with each other, the device may consider it as an intention of folding one of the two folding areas or may not map to any folding area.

Hence, in order to avoid the aforementioned complexity, as depicted in FIG. 8c, the device informs the user of the folding area where a function is activated via an indicator 830 and the like in the corresponding screen and may accommodate folding convenience of the user. Meanwhile, although it is not depicted, if the folding indicator 830 is activated, the device may preferentially inform a user of a function or an application performed in case that the area is folded via surroundings of the indicator 830, an audio, or the like to make the user identify the function or the application.

Figure 9:
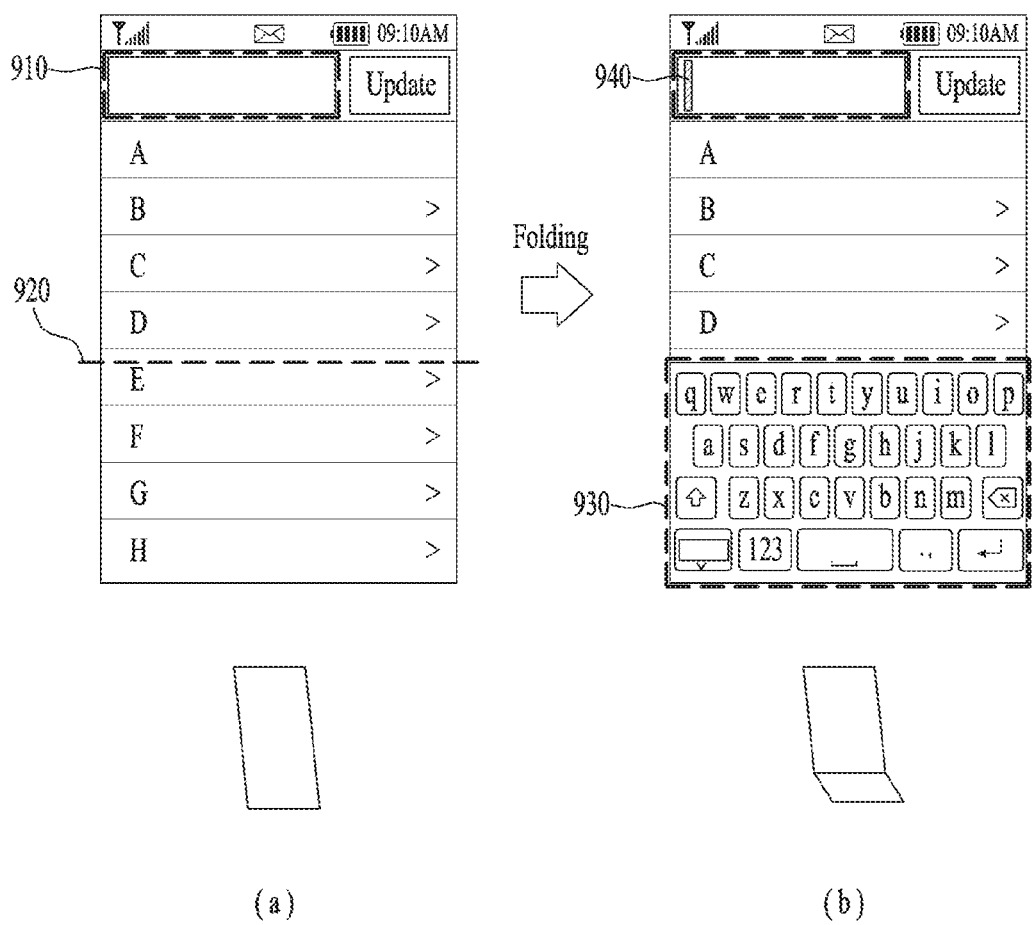
FIG. 9 is a diagram for explaining one embodiment of controlling an operation of a device in accordance with folding of the device according to the present invention.

FIG. 9 is a diagram for explaining one embodiment of controlling an operation of a device in accordance with folding of the device according to the present invention.

FIG. 9a shows a device before a folding is performed and FIG. 9b shows the device after the folding is performed.

For instance, FIG. 9 relates to a method of controlling an operation of the device according to folding of the device in a screen where a virtual keyboard is required such as a contact application.

Meanwhile, referring to FIG. 9, the aforementioned virtual keyboard is provided to the user according to folding of the device and a focusing can move to a screen interlocked with an input inputted via the virtual keyboard.

Referring to FIG. 9a, as mentioned in the foregoing description, there exist a search window 910 and a folding area indicator 920 in a screen of the device. In this case, assume that the focusing does not exist in the search window 910.

Referring to FIG. 9b, if a user folds a display according to the folding area indicator 920, a virtual keyboard 930 is provided in a folded area and a focusing 940 moves to the search window 910 as the virtual keyboard 930 is provided in the folded area.

Hence, in a state that the display is folded as depicted in FIG. 9b, if the user pushes a prescribed button on the virtual keyboard 930, the focusing 940 of the search window 910 moves and text data or the like can be provided to the user.

Meanwhile, although it is not depicted, if the folding area indicator 920 is provided in the screen, the user can randomly change/control the indicator 920. For instance, when a predetermined indicator 920 is used, if a size of the virtual keyboard 930 provided after the display is folded is different from an intention of the user, the size of the virtual keyboard can be freely controlled before the display is folded. As an example, the user selects the indicator 920 and may be then able to configure the indicator in a manner of changing a position of the indicator to up/down or a different line. As the configuration of the indicator changes, the device stores the corresponding change in the device and can enable the focusing to be performed while providing the virtual keyboard after the display is folded as depicted in FIG. 9b.

And, a change control of the user performed for the folding area may or may not function as one-time only. In the latter case, the device analyzes a pattern of use of the user in a corresponding screen, determines a folding line different from the folding line configured in the process of manufacturing the device, and may be then able to provide the folding line to the user.

Meanwhile, a folding area and a virtual keyboard area provided according to folding are not always matched with each other. In particular, a screen interlocked with a function or an application, which is activated according to the folding, may exist in the folding area. It is not mandatory for the screen to be matched with a whole of the folding area.

Figure 10:
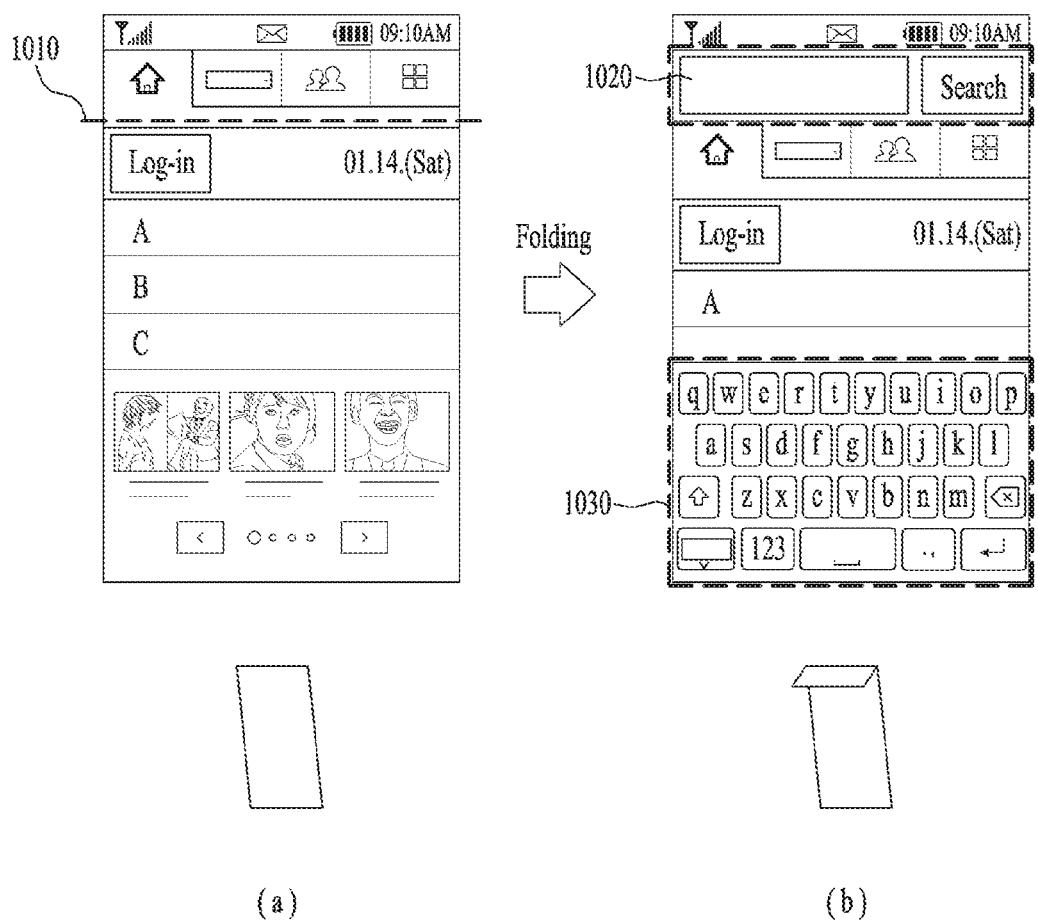
FIG. 10 is a diagram for explaining a different embodiment of controlling an operation of a device in accordance with folding of the device according to the present invention.

FIG. 10 is a diagram for explaining a different embodiment of controlling an operation of a device in accordance with folding of the device according to the present invention.

FIG. 10a shows a device before a folding is performed and FIG. 10b shows the device after the folding is performed.

For instance, FIG. 10 relates to a method of controlling an operation of the device according to folding of the device in a screen on which a web application is provided and a virtual keyboard is required for searching similar to the aforementioned FIG. 9.

Similar to FIG. 9, the virtual keyboard is provided to a user and a focusing can move as the virtual keyboard is provided.

Referring to FIG. 10a, there exists a folding area indicator 1010 in a screen of the device.

Referring to FIG. 10b, if a user folds a display according to the folding area indicator 1010, a search window 1020 is provided to a folded area. As the search window 1020 is provided, a focusing (not depicted) for searching convenience can move and a virtual keyboard 1030 is provided in a prescribed area (in the bottom of the screen in FIG. 10b) in a manner of being activated.

Or, in the foregoing description, although the search window 1020 is provided according the folding, the focusing may be not activated or moved and the virtual keyboard 1030 may not be provided as well. Subsequently, if a user randomly moves the focusing by touching the search window 1020, the virtual keyboard can be provided on the screen at that time in a manner of being activated.

Figure 11:
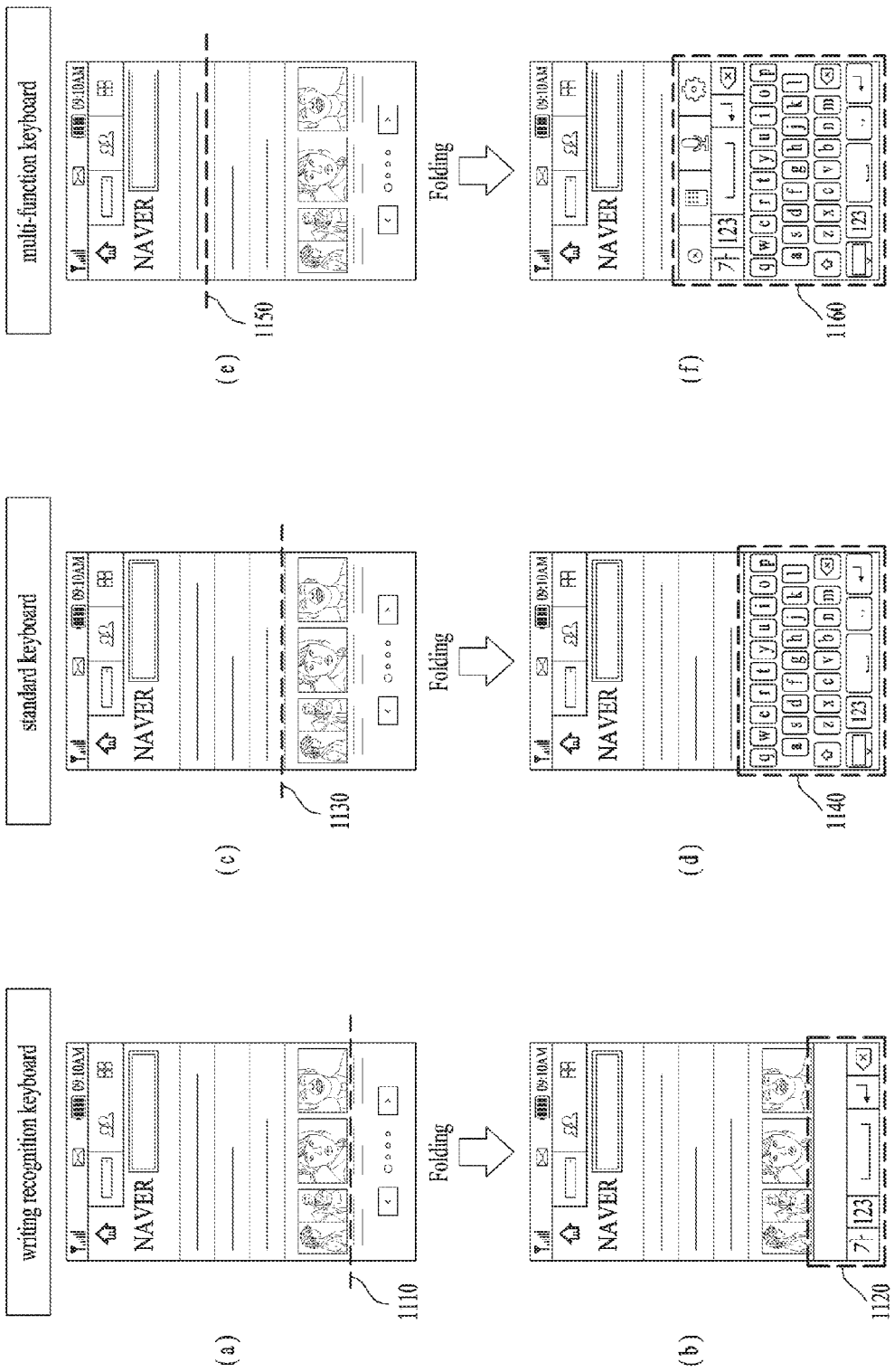
FIG. 11 is a diagram for explaining one embodiment of controlling a function of a device in accordance with a folding area (or line) in a screen of the device according to the present invention.

FIG. 11 is a diagram for explaining one embodiment of controlling a function of a device in accordance with a folding area (or line) in a screen of the device according to the present invention.

FIG. 11a to FIG. 11f shows that an operation of the device varies according to a folding area.

FIG. 11a to FIG. 11b corresponds to an example of implementing a first keyboard 1120 according to a first folding area 1110, FIG. 11c to FIG. 11d corresponds to an example of implementing a second keyboard 1140 according to a second folding area 1130, and FIG. 11e to FIG. 11f corresponds to an example of implementing a third keyboard 1160 according to a third folding area 1150.

In this case, the first folding area 1110 is formed in a lowest position in the screen, the third folding area is formed in a highest position in the screen, and the second folding area 1130 is formed between the first folding area 1110 and the third folding area 1150.

Meanwhile, the device can notify the user of the first to the third folding area 1110/1130/1150 in advance using at least one indicator automatically or according to a user selection.

And, the first keyboard 1120 corresponds to a writing recognition keyboard, the second keyboard 1140 corresponds to a standard keyboard, and the third keyboard may correspond to a multi-function keyboard.

In other word, if a user folds the display on the basis of the first folding area 1110 depicted in FIG. 11a, the device provides the first keyboard, i.e., the writing recognition keyboard 1120 depicted in FIG. 11b to the user.

If the user folds the display on the basis of the second folding area 1130 depicted in FIG. 11c, the device provides the second keyboard, i.e., the standard keyboard 1140 depicted in FIG. 11d to the user.

If the user folds the display on the basis of the third folding area 1150 depicted in FIG. 11e, the device provides the third keyboard, i.e., the multi-function keyboard 1160 depicted in FIG. 11f to the user.

As mentioned in the foregoing description, a function, a tool, or the like may vary in an identical screen according to a folding area or a folding position of the user.

Meanwhile, as mentioned in the foregoing description, for instance, if the user folds a line between the first folding area 1110 depicted in FIG. 11a and the second folding area 1130 depicted in FIG. 11b, the device can provide the first keyboard 1120 depicted in FIG. 11b or the second keyboard depicted in FIG. 11d to the user according to a distance between the folding position of the user and the line between the first folding area 1110 and the second folding area 1130.

In this case, if the folding position of the user corresponds to a line positioned in the middle of the first folding area 1110 and the second folding area 1130, the device can randomly provide the first keyboard 1120 depicted in FIG. 11b or the second keyboard depicted in FIG. 11d to the user and may further refer to a different condition.

In general, the device provides the standard keyboard 1140 depicted in FIG. 11d to the user to satisfy a user convenience. Yet, if the user has a stylus pen separated from the device, the device may provide the writing recognition keyboard depicted in FIG. 11b to the user.

FIG. 12 to FIG. 16 is a diagram for explaining a method of controlling an e-book application in accordance with folding of a device when the e-book application is executed in the device according to the present invention.

In case that an e-book application is executed in the device according to the present invention, FIG. 12 relates to a method of controlling the application according to folding in the device.

Referring to FIG. 12a, the device outputs a text or an image of a page form on a display screen via a browser interlocked with the e-book application. In this case, if a user takes such a user action as a touch, an eye-tracking, a gesture, or the like on a prescribed area of the display screen or a certain area, the device outputs an area capable of being folded in one area 1210 of the screen.

In this case, if the user folds the area 1210 capable of being folded, the device provides a preview area 1220 and a page selection area 1230 to the user as depicted in FIG. 12b.

In a state of FIG. 12b, if the user inputs a certain input on the page selection area 1230, which is provided according to the folding, via a finger 1240, the device performs a control for the application according to the input. In this case, for instance, the control may include selecting a page, moving a page, and the like.

For instance, in a state that a page is selected via the finger 1240, if a contact of the finger 1240 on the page selection area 1230 is released again and folding of the display is released, the page used to be watched by the user can be maintained. If the folding of the display is released while the finger 1240 for selecting the page is contacted with the page selection area, the device can display the corresponding page as a main page in a manner of jumping to a preview page. And, the device may intuitively display that the page selection area has the small number of pages only in a state that the display is folded since the page selection area is reducing as a page moves to following pages.

Figure 13:
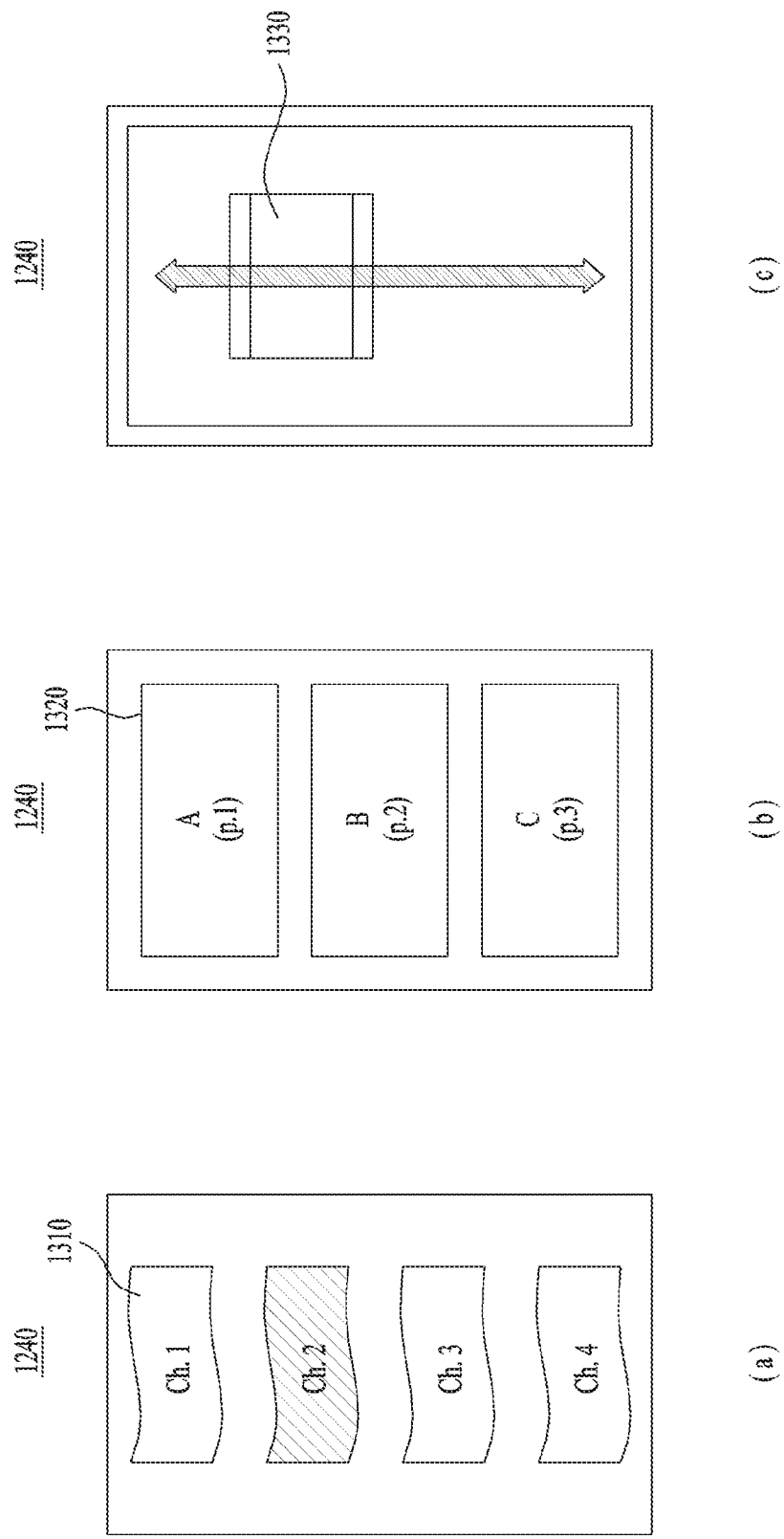

For instance, FIG. 13 is a diagram for explaining the page selection area 1230 depicted in FIG. 12 in more detail.

Referring to FIG. 13a, the page selection area 1230 includes an icon or an item of a chapter unit for a convenience of a page movement and a quick page movement of a user using the device.

Referring to FIG. 13b, the page selection area 1230 includes an icon or an item 1320 indicating a reduced image of each page for a convenience of identifying a page of a user using the device. In this case, the icon or the item 1320 indicating the reduced image of the each page may include an image data, a text data, a page number for identifying a corresponding page, or the like.

FIG. 13c shows a scroll bar 1330 used for a page jumping or a prompt page switching of a user using the device.

In relation to this, referring to FIG. 13a, if the user selects an icon 1310 corresponding to a chapter to move in a predetermined chapter unit, the user can move to a first page of the chapter.

Referring to FIG. 13b, since the user can move in a page unit, if a page difference is not considerable on the basis of a current page, the user can accurately move to a preferred page.

On the contrary, if the user intends to move the large number of pages all at once, FIG. 13c may be much more effective compared to FIG. 13a or FIG. 13b.

In the following FIG. 14 to FIG. 16, content duplicated with the content described in FIG. 12 can be invoked, detail explanation on the duplicated content is omitted, and a different point is mainly explained in FIG. 14 to FIG. 16.

Figure 14:
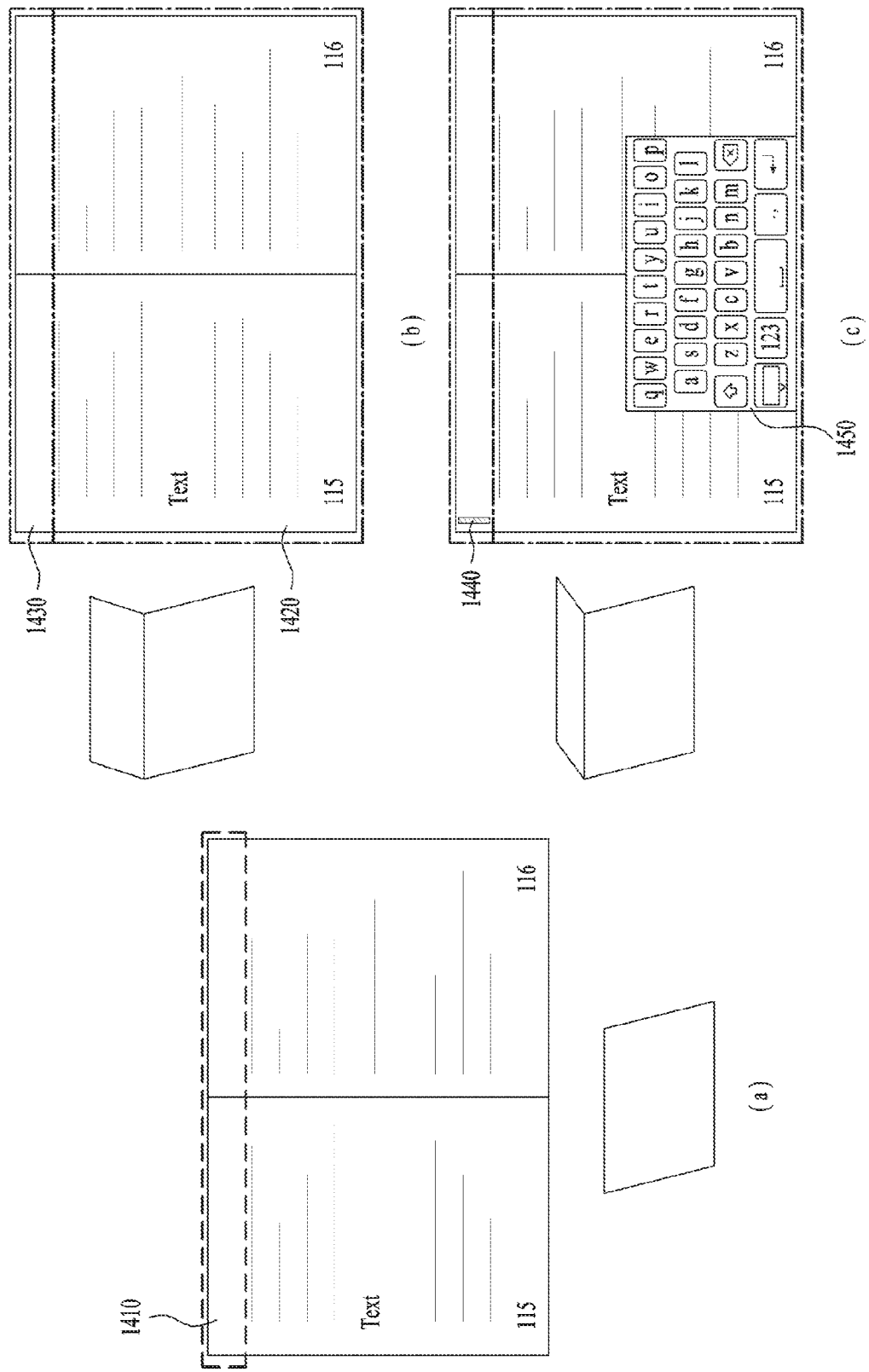

FIG. 14 explains a case that a folding area is positioned at an upper edge unlike the folding area positioned at the right edge depicted in FIG. 12 and a method of controlling an operation of the device in that case.

Referring to FIG. 14a, a folding area 1410 exists in an upper edge. If the folding area is folded as depicted in FIG. 14b, a main data or an image is outputted in a first area 1420.

As depicted in FIG. 14c, if the device is folded, the device identifies that the upper edge of the device is folded and activates a searching function according to the folding. Hence, as depicted in FIG. 14c, a focus 1440 is provided on a second area, i.e., a folding area 1430 and a virtual keyboard 1450 related to the activated searching function is outputted within the first area 1420. The device outputs a text data of the user, which is inputted via the virtual keyboard 1450, in the folding area 1430 according to the focus.

For instance, the searching function searches for the data inputted by the user based on a corresponding application or an index of a book, contents, or a page of the book according to execution of the application. Or, the searching function may correspond to a web search function depicted in FIG. 10 to FIG. 11.

Figure 15:
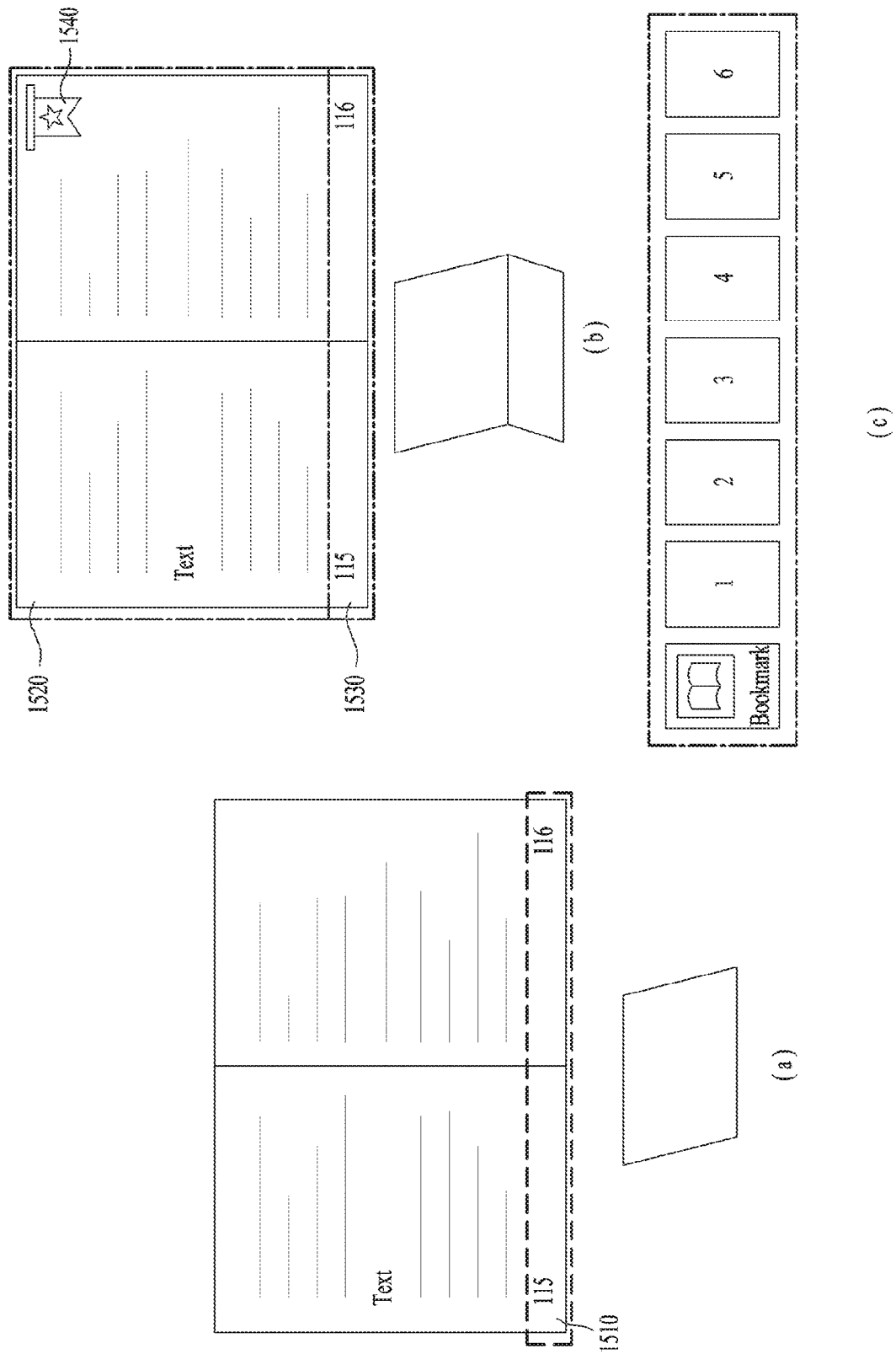

FIG. 15 explains a case that a folding area is positioned at a bottom edge instead of the folding area positioned at the right edge depicted in FIG. 12 and the folding area positioned at the upper edge depicted in FIG. 14 and a method of controlling an operation of the device in that case.

Referring to FIG. 15a, a folding area 1510 exists in a bottom edge. If the folding area is folded as depicted in FIG. 15b, a main data or an image is outputted in a first area 1520.

As depicted in FIG. 15c, if the device is folded, the device identifies that the bottom edge of the device is folded and activates a bookmark function according to the folding.

Hence, as depicted in FIG. 15b, the device outputs an icon or an item 1540 indicating that a corresponding page is bookmarked in a prescribed position of a first area 1520 and provides an icon for a pre-stored bookmark or item(s) in a second area, i.e., a folding area 1530.

For instance, referring to FIG. 15c, the folding area 1530 provides the icon displaying a bookmark function and a page list bookmarked in advance for a corresponding content.

In this case, if a user selects a bookmark icon in the list provided by the device depicted in FIG. 15c, the user can immediately jump or switch to a page corresponding to the selected bookmark icon.

In this case, the book mark list provided in the folding area 1530 may be non-limited to the corresponding content. Instead, all book mark lists set to the device or stored in the device can be provided in the folding area.

Meanwhile, FIG. 16 explains a control operation of the device according to folding in case that a folding area exists in the middle of a display.

First of all, FIG. 16a shows a display screen 1610 before folding is performed. Content of a page unit can be provided on the screen and a screen partition function can be activated by folding a middle of the display screen.

Hence, as depicted in FIG. 16b, the content used to be provided in one page unit can be provided in two or more page units. A first area 1620 positioned at the left of the screen depicted in FIG. 16b is identical to the content page 1610 used to be provided on the screen depicted in FIG. 16a and a second area 1630 positioned at the right of the screen may correspond to a next page of the screen depicted in FIG. 16a.

Figure 17:
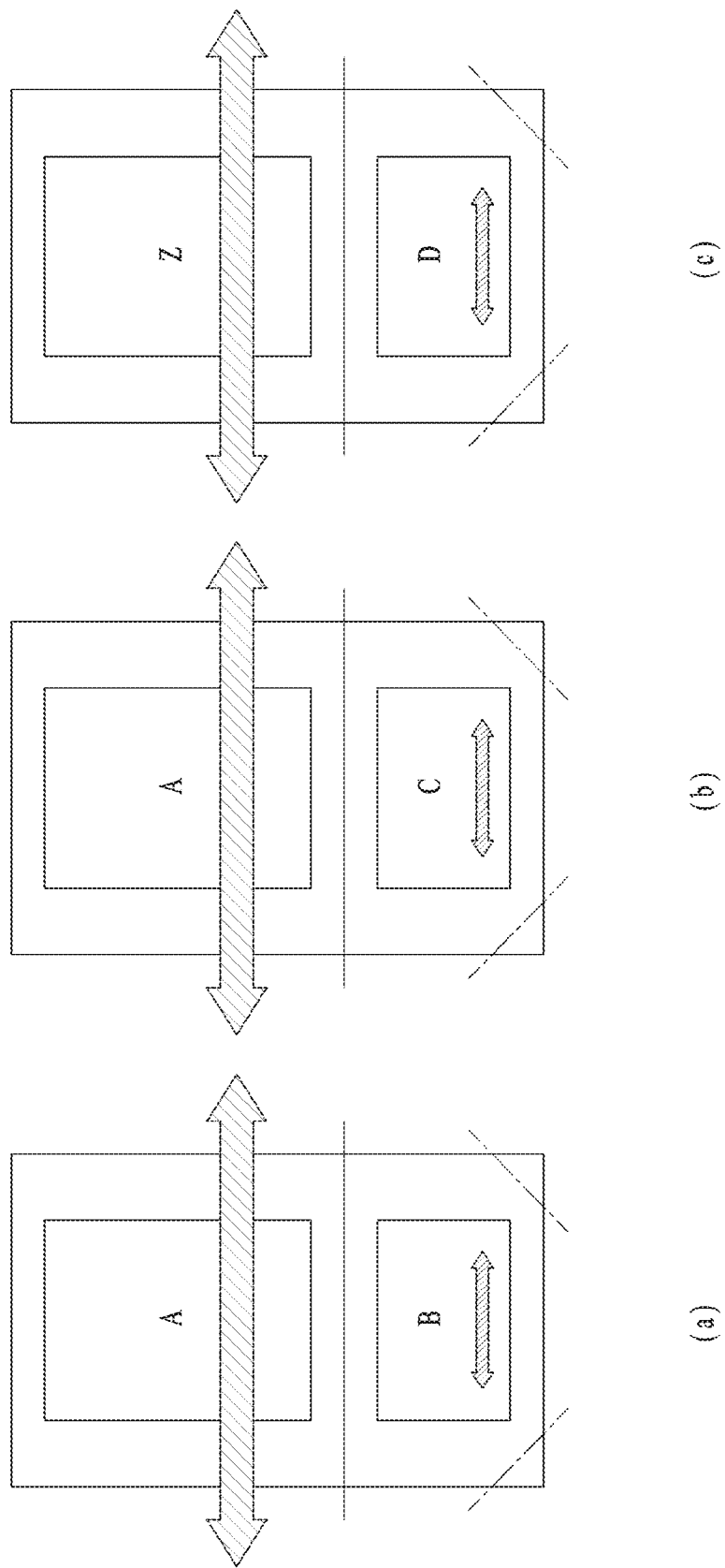
FIG. 17 to FIG. 19 is a diagram for explaining a method of controlling each area divided by folding a device according to the present invention.
Figure 18:
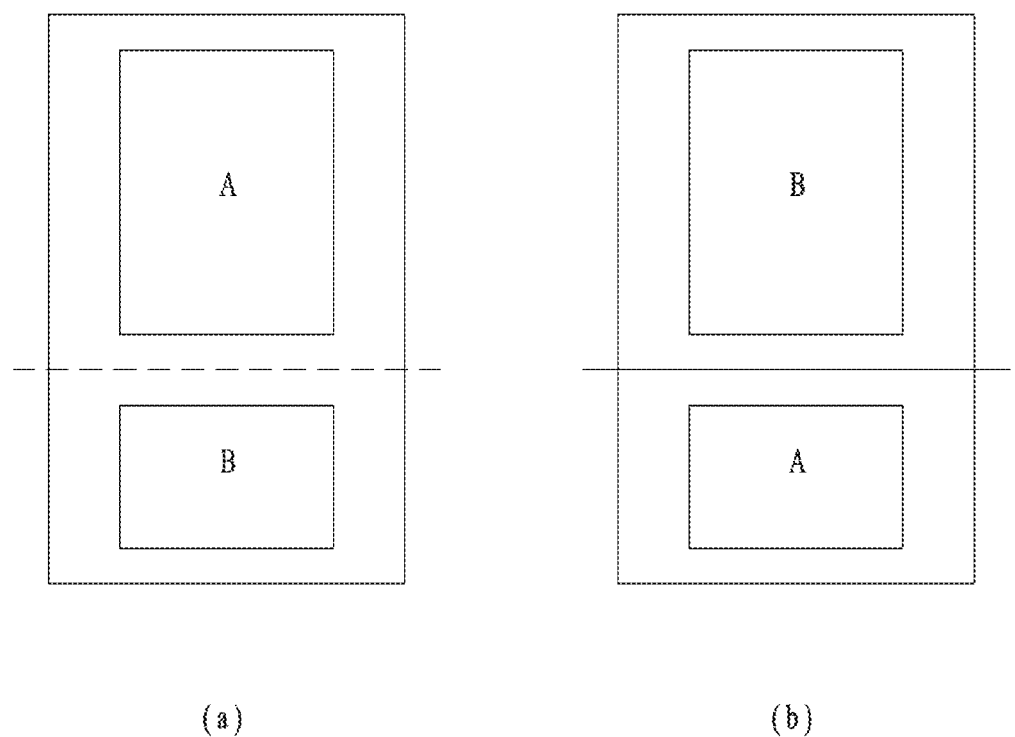
Figure 19:
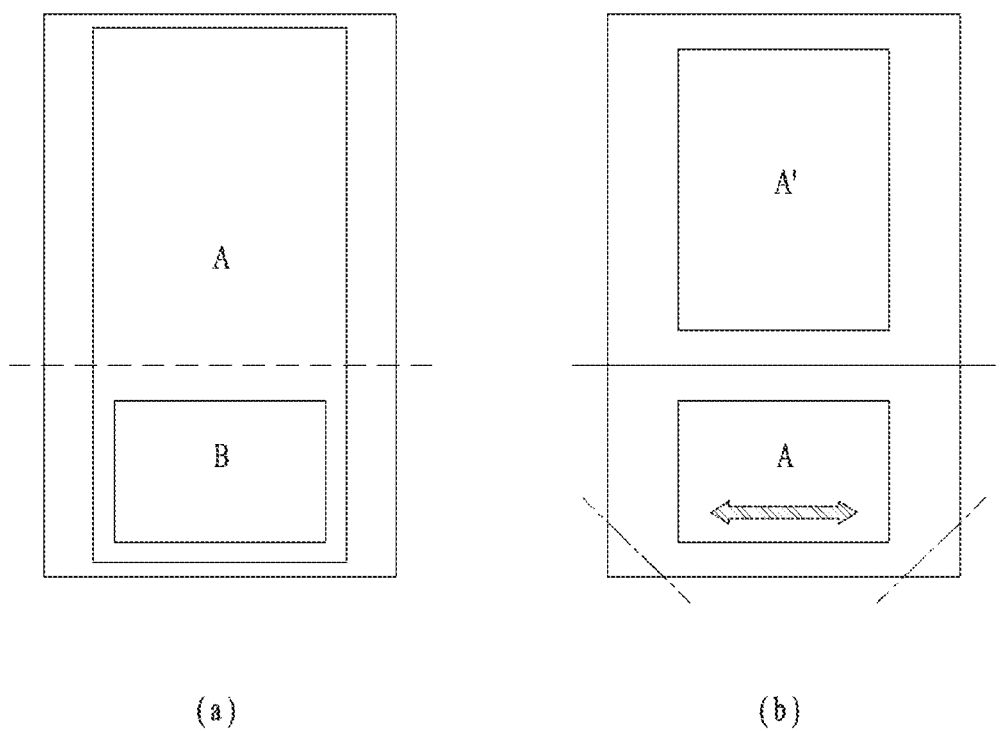

FIG. 17 to FIG. 19 is a diagram for explaining a method of controlling each area divided by folding a device according to the present invention.

FIG. 17a to FIG. 17c corresponds to contents of individually controlling areas in a screen which is divided according to folding of the device.

FIG. 17a may correspond to a first screen which is provided due to the folding of the device.

Referring to FIG. 17a, an upper area and a bottom area can be individually controlled. A control for each of the areas can be performed by folding and/or flicking the corresponding area.

For instance, FIG. 17b shows a screen provided in a manner of flicking a bottom area left/right without controlling an upper area on the device depicted in FIG. 17a or folding a prescribed area capable of being folded of the bottom area.

Meanwhile, FIG. 17c shows a screen provided by controlling the upper area on the device depicted in FIG. 17a, i.e., the screen provided in a manner of flicking the upper area left/right or folding a prescribed area capable of being folded of the upper area as well as controlling the bottom area depicted in FIG. 17b.

FIG. 18 explains that content of an upper area and content of a bottom area on a device are switched to each other according to folding.

In particular, FIG. 18a shows a device before the device is folded. Content A is provided in the upper area of the device and content B is provided in the bottom area of the device. In this case, if folding is performed, the device outputs the content A, which is used to be provided in the upper area, in the bottom area and outputs the content B, which is used to be provided in the bottom area, in the upper area. Meanwhile, if a size or resolution of the upper area and that of the bottom area are different from each other, corresponding content can be provided in a manner of being converted to the size, resolution, and the like of the corresponding area when the switching is performed.

If the device includes at least one object capable of being separated, individually selected, or controlled, FIG. 19 relates to a method of dividing or individually controlling the at least one object by folding the device.

FIG. 19a shows content A including an object, which is called B, capable of being selected or separated.

Referring to FIG. 19b, if folding is performed in a state of FIG. 19a, the device separates the object B from the content A, provides the object B in the bottom area divided by the folding, and outputs the content A, which is used to be provided, in the upper area in a manner of reducing (content A') the content A.

For instance, data on breaking news, weather condition, stock quotations, and the like provided in the course of watching news (content A) is separated from the content A and provided in the bottom area and data (A/V) on the news can be provided in the upper area only.

Meanwhile, referring to FIG. 19b, as mentioned earlier in FIG. 17 to FIG. 18, each area of the device divided by the folding can be individually controlled as well.

Figure 20:
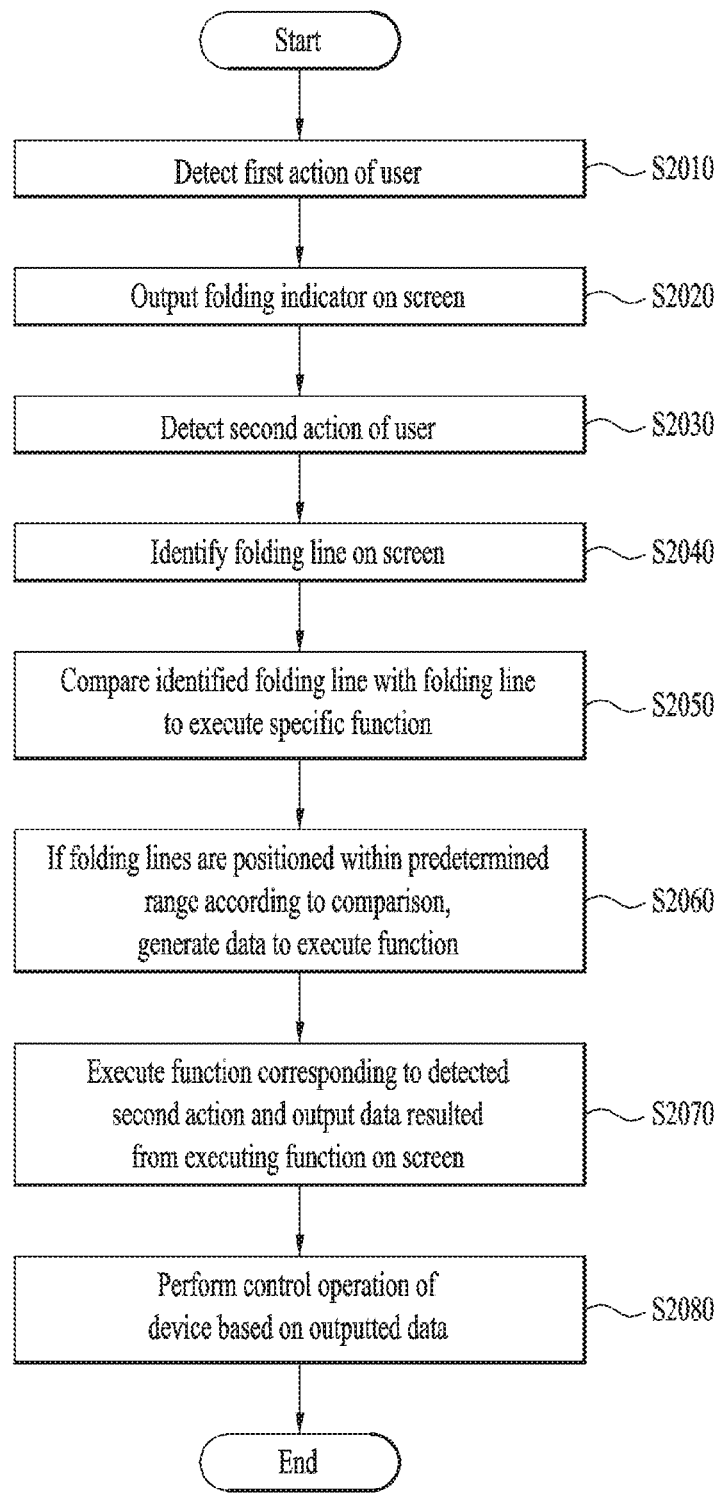
FIG. 20 is a flowchart for explaining a method of controlling a device according to the present invention.

FIG. 20 is a flowchart for explaining a method of controlling the device according to the present invention in case that the device is folded First of all, the device detects a first action of a user [S2010] and outputs a folding indicator on a screen according to the detected first action of the user [S2020].

Subsequently, the device detects a second action of the user [S2030], executes a function corresponding to the detected second action, and outputs data resulted from executing the function on the screen [S2070].

Subsequently, the device performs an operation controlling the device based on the outputted data [S2080].

In the foregoing description, the folding indicator may include at least one of at least one foldable line and data on a function corresponding to the foldable line on the screen.

And, the data resulted from executing the function can be outputted in at least one of areas of the screen divided by the second action of the user.

And, each of the divided areas on the screen can be individually controlled according to a third action of the user.

And, the second action includes a prescribed action among an action for a single folding and an action for multi-folding. The multi-folding may include at least one of folding for an identical foldable line and folding for foldable lines different from each other.

And, the function corresponding to the detected second action can vary according to whether the detected second action corresponds to the action for the single folding or the action for the multi-folding.

And, the function can be determined by at least one selected from the group consisting of a folding line according to the second action, a folding angle, and the number of folding.

And, the device identifies a folding line on the screen according to the detected second action of the user [S2040] and compares the identified folding line with a folding line to execute a specific function on the screen [S2050].

Subsequently, according to the comparison, if the folding lines are positioned within a predetermined range, the device generates the data to execute the function [S2060].

And, the step of executing the function corresponding to the detected second action and the step of outputting the data resulted from executing the function on the screen may include a step of generating and outputting auxiliary data for the data resulted from executing the function on the screen.

And, the device identifies at least one object capable of being selected or separated from content outputted on the screen and may output the identified at least one object in one area among the areas on the screen divided by the second action of the user in a manner of separating it from the content.

Meanwhile, in the present disclosure, if pluralities of areas are divided by folding, it may randomly determine at least one reference area and may output an audio data, which is outputted in the randomly determined reference area, via a speaker or the like. In this case, audio data of content A outputted via the speaker is muted and audio data of content B, which is switched by the folding, can be outputted instead.

Besides, although it is not depicted, the device can individually control each of the areas divided by the folding and may provide the content provided in each of the areas in a manner of switching the content to a front part or a rear part of the screen.

For instance, as depicted in FIG. 6b, in case that multi-folding are performed, content can be provided in a rear part of one area 670 and content can be provided in a front part of another areas 660/680. This is because if the device is folded, since a user can watch the content in various angles compared to the device which is not folded, it is intended to prepare for a situation capable of being occurred in case that a user watches the content in various angles. In this case, if an eye-tracking sensor exists in at least one area, the sensor predicts a movement of a pupil and a gaze of the user. By doing so, the device can control a screen to be switched between the front part and the rear part.

Meanwhile, as depicted in FIG. 6b, as the multi-folding are enabled, the device can sequentially provide a main menu, a first sub menu, and a second sub menu (a sub menu of the first sub menu) in one area, a different adjacent area, and a further different area, respectively. Moreover, the device can simultaneously play a series and a different channel in each of the areas and may provide such an image as a relevant picture and the like in each of the areas in a panorama form.

Meanwhile, the present disclosure has explained that the device provides a foldable line or an area capable of being identified to the user. In this case, there may exist a problem of when the folding line or the area is provided to the user. This is because if a small foldable line or an area is provided to the user, it may interrupt the user to watch a screen. Hence, when the device provides identification information on the folding line or the area to the user at least once in a corresponding application or a function, if there is no user action within a predetermined time, the device may not provide the identification information to the user. In relation to this, the identification information can be provided to the user when the user touches at least one edge among each of the edges of the screen. The device outputs mapping function data corresponding to the identification information on the folding line or the area in the screen together with the identification information in order for the user to easily select a specific folding line or an area.

The present disclosure has mainly explained a control operation of the device in case that a user directly folds a display. Yet, it may also be able to control the device with a concept opposite to the aforementioned concept.

For instance, if a user activates or selects a search window provided in an upper edge of a mobile device (before folding), a virtual keyboard and the like should be provided to enable the user to use a search function via the selected or activated search window. In this case, since the virtual keyboard blocks a screen or is provided in an unfolded screen, it may give inconvenience to the user. Hence, if folding is automatically performed on the basis of an area corresponding to the activated virtual keyboard and the virtual keyboard is provided in a prescribed area divided by the folding, it may give convenience to the user.

All of the aforementioned contents or a part of the aforementioned contents can be identically or similarly applied to a device to which a flexible display is not adopted via a different scheme, which replaces the folding or corresponds to the folding. In the foregoing description, as the different scheme, a touch line or a tap-bar is moved from a first edge to a second edge to activate a function according to a position where the touch line or the tap-bar is put.

It will be apparent to those skilled in the art that various modifications and variations can be made in the present invention without departing from the spirit or scope of the invention.

The present invention mentioned in the foregoing description can be implemented with a code readable by a computer in a media in which a program is recorded. The media readable by the computer may include all kinds of recording devices for storing data capable of being read by the computer system. The examples of the media readable by the computer may include a ROM, a RAM, a CD-ROM, a magnetic tape, a floppy disc, an optical data storing device and the like. And, implementing in a form of a carrier wave (e.g., transmission via the internet) is also included. And, the computer may include a control unit 180 of a device.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present disclosure. Thus, it is intended that the present disclosure covers the modifications and variations of this invention that come within the scope of the appended claims and their equivalents.

INDUSTRIAL APPLICABILITY

The present invention relates to a mobile device and a method of controlling the same and is applicable to all digital apparatus.

The invention claimed is:

1. A method of controlling a mobile device, the method comprising the steps of:
    detecting a first action of a user;
    outputting a folding indicator on a screen of a flexible display of the mobile device according to the detected first action of the user, wherein detecting the first action and outputting the folding indicator occur before folding of the flexible display is performed;
    detecting a second action of the user;
    executing a function corresponding to the detected second action and outputting data resulted from executing the function on the screen; and
    controlling the device based on the outputted data,
    wherein the folding indicator indicates:
        at least one folding line capable of being folded along the screen of the flexible display; and
        at least one function to be performed in case the at least one folding line is folded.

2. The method of claim 1, wherein:
    the first action is execution of an application such that the folding indicator is output on the screen according to the executed application;
    the second action is folding of the flexible display according to the folding indicator; and
    the executed function is associated with the application.

3. The method of claim 1, wherein the data resulted from executing the function is outputted in one or more areas which are divided according to the second action of the user on the screen.

4. The method of claim 3, wherein each area divided on the screen is individually controlled according to a third action of the user.

5. The method of claim 1, wherein the second action comprises at least one of an action for a single folding or an action for multi-folding and wherein the multi-folding comprises at least one of folding for an identical foldable line or folding for foldable lines different from each other.

6. The method of claim 5, wherein the function corresponding to the detected second action varies according to whether the detected second action corresponds to the action for the single folding or the action for the multi-folding.

7. The method of claim 1, wherein the executed function is determined according to at least one selected from the group consisting of a folding line, a folding angle, and a number of folding.

8. The method of claim 1, further comprising one or more steps of:
    identifying a folding line on the screen according to the detected second action of the user;
    comparing the identified folding line with a folding line to execute a specific function on the screen; and
    generating the data to execute the function when the folding lines are positioned within a predetermined range according to the comparison.

9. The method of claim 1, wherein the step of executing the function corresponding to the detected second action and outputting the data resulted from executing the function on the screen is to generate an auxiliary data for the data resulted from executing the function and output the auxiliary data on the screen together with the data resulted from executing the function.

10. The method of claim 3, further comprising the steps of:
    identifying at least one object capable of being selected or separated from content outputted on the screen; and
    outputting the identified at least one object in one area among the areas divided by the second action of the user on the screen in a manner of separating the identified at least one object from the content.

11. A mobile device, comprising:
    a flexible display including a screen and configured to display information related to the mobile device on the screen;
    a sensor unit configured to detect a first action and a second action of a user to fold the flexible display; and
    a controller configured to:
        cause the flexible display to display a folding indicator on the screen according to the detected first action of the user, wherein detecting the first action and displaying the folding indicator occur before folding of the flexible display is performed;
        execute a function corresponding to the detected second action;
        cause the flexible display to display data resulted from executing the function on the screen; and
        control the mobile device based on the displayed data,
    wherein the folding indicator indicates:
        at least one folding line capable of being folded on the screen of the flexible display; and
        at least one function to be performed in case the at least one folding line is folded.

12. The mobile device of claim 11, wherein:
    the first action is execution of an application such that the folding indicator is displayed on the screen according to the executed application;

the second action is folding of the flexible display according to the folding indicator; and the executed function is associated with the application.

13. The mobile device of claim 11, wherein the controller is further configured to cause the flexible display to display the data resulted from executing the function in one or more areas which are divided according to the second action of the user on the screen.

14. The mobile device of claim 13, wherein the controller is further configured to individually control each area divided on the screen according to a third action of the user.

15. The mobile device of claim 11, wherein the second action comprises at least one of an action for a single folding or an action for multi-folding and wherein the multi-folding comprises at least one of folding for an identical foldable line or folding for foldable lines different from each other.

16. The mobile device of claim 15, wherein the controller is further configured to control the function corresponding to the detected second action to be differently executed according to whether the detected second action corresponds to the action for the single folding or the action for the multi-folding.

17. The mobile device of claim 11, wherein the controller is further configured to determine the executed function according to at least one selected from the group consisting of a folding line, a folding angle, and a number of folding.

18. The mobile device of claim 11, wherein the controller is further configured to:

identify a folding line on the screen according to the detected second action of the user;

compare the identified folding line with a folding line to execute a specific function on the screens; and generate the data to execute the function when the folding lines are positioned within a predetermined range according to the comparison.

19. The mobile device of claim 11, wherein the controller is further configured to:

execute the function corresponding to the detected second action;

cause the flexible display to display the data resulted from executing the function on the screen;

generate an auxiliary data for the data resulted from executing the function; and cause the flexible display to display the auxiliary data on the screen together with the data resulted from executing the function.

20. The mobile device of claim 13, wherein the controller is further configured to:

identify at least one object capable of being selected or separated from content outputted on the screen; and cause the flexible display to display the identified at least one object in one area among the areas divided by the second action of the user on the screen in a manner of separating the identified at least one object from the content.

* * * * *